(12) United States Patent
Tsai et al.

(10) Patent No.: US 10,345,554 B2
(45) Date of Patent: *Jul. 9, 2019

(54) OPTICAL PHOTOGRAPHING LENS ASSEMBLY, IMAGE CAPTURING DEVICE AND MOBILE TERMINAL

(71) Applicant: LARGAN PRECISION CO., LTD., Taichung (TW)

(72) Inventors: Tsung-Han Tsai, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 248 days.

This patent is subject to a terminal disclaimer.

(21) Appl. No.: 15/273,681

(22) Filed: Sep. 22, 2016

(65) Prior Publication Data

US 2017/0010448 A1    Jan. 12, 2017

Related U.S. Application Data

(63) Continuation of application No. 14/944,189, filed on Nov. 17, 2015, now Pat. No. 9,482,849, which is a (Continued)

(30) Foreign Application Priority Data

Nov. 8, 2013 (TW) .............................. 102140782 A

(51) Int. Cl.
*G02B 13/00* (2006.01)
*G02B 9/60* (2006.01)
(Continued)

(52) U.S. Cl.
CPC .......... *G02B 13/0045* (2013.01); *G02B 9/60* (2013.01); *G02B 5/005* (2013.01); *G02B 5/208* (2013.01); *G02B 27/0025* (2013.01)

(58) Field of Classification Search
CPC ... G02B 9/60; G02B 9/62; G02B 9/64; G02B 13/0045
See application file for complete search history.

(56) References Cited

U.S. PATENT DOCUMENTS

| 8,792,185 B2 | 7/2014 | Hsu et al. |
| 2012/0154929 A1 | 6/2012 | Tsai et al. |

(Continued)

*Primary Examiner* — Darryl J Collins
*Assistant Examiner* — Journey F Sumlar
(74) *Attorney, Agent, or Firm* — CKC & Partners Co., LLC

(57) ABSTRACT

An optical photographing lens assembly includes, in order from an object side to an image side, a first lens element, a second lens element, a third lens element, a fourth lens element and a fifth lens element. The first lens element has refractive power. The second lens element has positive refractive power. The third lens element with positive refractive power has an image-side surface being concave in a paraxial region thereof. The fourth lens element has refractive power. The fifth lens element with refractive power has an image-side surface being concave in a paraxial region thereof, wherein an object-side surface and the image-side surface of the fifth lens element are aspheric, and at least one of the surfaces of the fifth lens element has at least one inflection point. The optical photographing lens assembly has a total of five lens elements with refractive power.

44 Claims, 24 Drawing Sheets

Related U.S. Application Data continuation of application No. 14/092,891, filed on Nov. 27, 2013, now Pat. No. 9,223,114.

(51) Int. Cl.
    *G02B 5/00*           (2006.01)
    *G02B 5/20*           (2006.01)
    *G02B 27/00*         (2006.01)

(56) References Cited

U.S. PATENT DOCUMENTS

| | | | |
|---|---|---|---|
| 2012/0188654 A1* | 7/2012 | Huang | G02B 9/62 |
| | | | 359/713 |
| 2013/0321932 A1 | 12/2013 | Hsu et al. | |
| 2015/0098137 A1 | 4/2015 | Chung et al. | |
| 2015/0338610 A1* | 11/2015 | Hsieh | G02B 27/0025 |
| | | | 348/360 |

* cited by examiner

OPTICAL PHOTOGRAPHING LENS ASSEMBLY, IMAGE CAPTURING DEVICE AND MOBILE TERMINAL

RELATED APPLICATIONS

This application is a continuation of U.S. patent application Ser. No. 14/944,189, filed on Nov. 17, 2015, which is a continuation of U.S. patent application Ser. No. 14/092,891, filed on Nov. 27, 2013, U.S. Pat. No. 9,223,114, which claims priority to Taiwan Application Serial Number 102140782, filed on Nov. 8, 2013. The entire disclosures of applications are hereby incorporated by reference herein.

BACKGROUND

Technical Field

The present disclosure relates to an optical photographing lens assembly, image capturing device and mobile terminal. More particularly, the present disclosure relates to a compact optical photographing lens assembly and image capturing device applicable to a mobile terminal.

Description of Related Art

In recent years, with the popularity of mobile terminals having camera functionalities, the demand of miniaturized optical systems has been increasing. The sensor of a conventional optical system is typically a CCD (Charge-Coupled Device) or CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Although other conventional optical systems with five-element lens structure enhances image quality; however, the arrangement of the positive refractive power is not favorable for providing wide viewing angle and maintaining a compact size. Moreover, it is also not favorable for reducing the photosensitivity of the optical systems and correcting the astigmatism which might thereby influence image quality.

SUMMARY

According to one aspect of the present disclosure, an optical photographing lens assembly includes, in order from an object side to an image side, a first lens element, a second lens element, a third lens element, a fourth lens element and a fifth lens element. The first lens element has refractive power. The second lens element has positive refractive power. The third lens element with positive refractive power has an image-side surface being concave in a paraxial region thereof. The fourth lens element has refractive power. The fifth lens element with refractive power has an image-side surface being concave in a paraxial region thereof, wherein both of an object-side surface and the image-side surface of the fifth lens element are aspheric, and at least one of the object-side surface and the image-side surface of the fifth lens element has at least one inflection point. The optical photographing lens assembly has a total of five lens elements with refractive power. When an axial distance between the object-side surface of the first lens element and an image plane is TL, and a maximum image height of the optical photographing lens assembly is ImgH, the following condition is satisfied:

$$0.8 < TL/ImgH < 2.5$$

According to another aspect of the present disclosure, an image capturing device includes the optical photographing lens assembly according to the aforementioned aspect and an image sensor, wherein the image sensor is located on the image plane of the optical photographing lens assembly.

According to still another aspect of the present disclosure, a mobile terminal includes the image capturing device according to the foregoing aspect.

According to yet another aspect of the present disclosure, an optical photographing lens assembly includes, in order from an object side to an image side, a first lens element, a second lens element, a third lens element, a fourth lens element and a fifth lens element. The first lens element with refractive power has an object-side surface being convex in a paraxial region thereof. The second lens element has positive refractive power. The third lens element with positive refractive power has an object-side surface being convex in a paraxial region thereof and an age-side surface being concave in a paraxial region thereof. The fourth lens element with positive refractive power has an image-side surface being convex in a paraxial region thereof. The fifth lens element with negative refractive power has an image-side surface being concave in a paraxial region thereof, wherein both of an object-side surface and the image-side surface of the fifth lens element are aspheric, and at least one of the object-side surface and the image-side surface of the fifth lens element has at least one inflection point. The optical photographing lens assembly has a total of five lens elements with refractive power.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
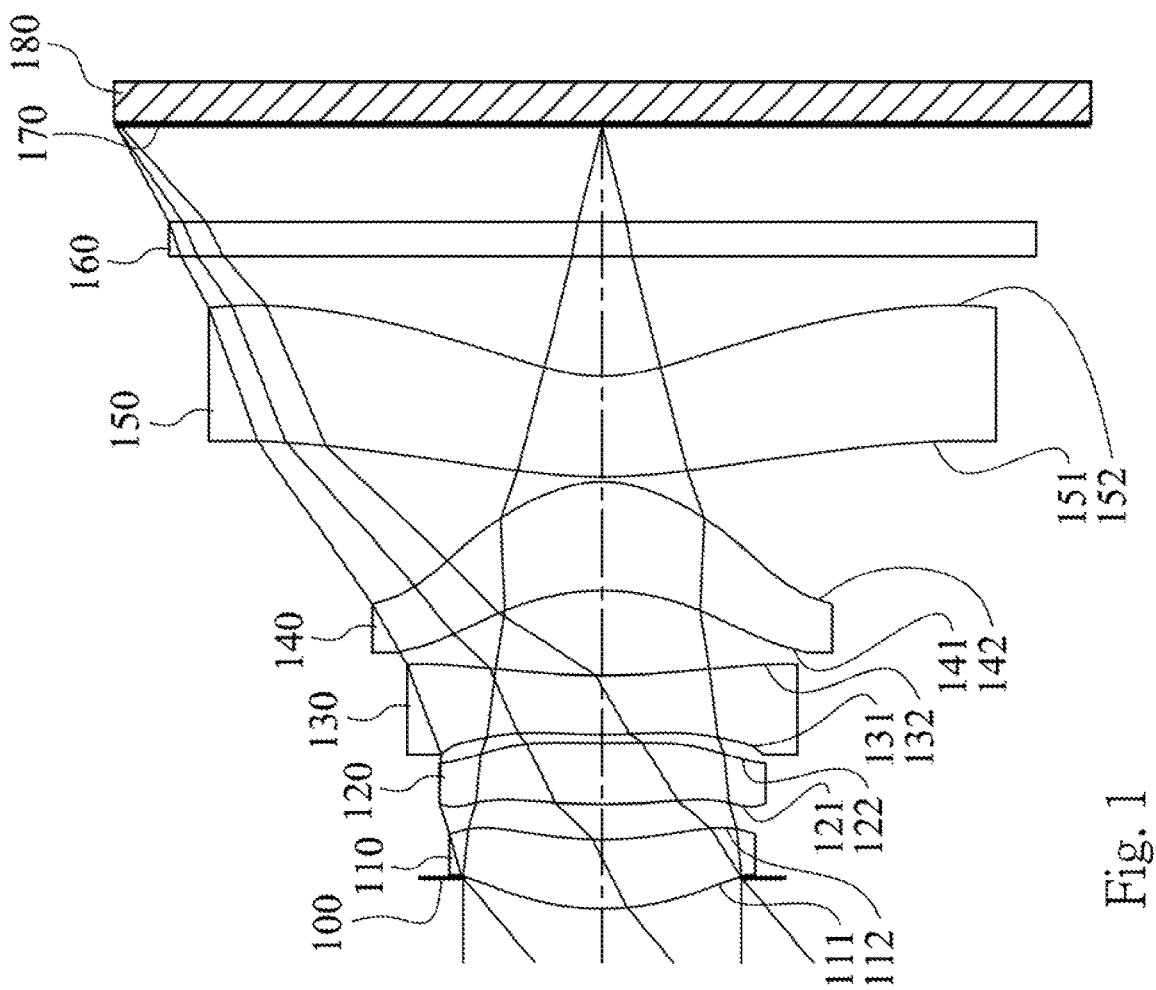
FIG. 1 is a schematic view of an image capturing device according to the 1st embodiment of the present disclosure.

An optical photographing lens assembly includes, in order from an object side to an image side, a first lens element, a second lens element, a third lens element, a fourth lens element and a fifth lens element. The optical photographing lens assembly has a total of five lens elements with refractive power.

The first lens element can have positive refractive power, an object-side surface being convex in a paraxial region thereof and an image-side surface being concave in a paraxial region thereof. Therefore, it is favorable for properly adjusting the positive refractive power so as to reduce the astigmatism and the total track length of the optical photographing lens assembly.

The second lens element has positive refractive power, so that it is favorable for balancing the distribution of the positive refractive power so as to avoid overloading the positive refractive power on one single lens element resulting in excessive aberration.

The third lens element with positive refractive power can have an object-side surface being convex in a paraxial region thereof and has an image-side surface being concave in a paraxial region thereof. Therefore, it is favorable for the light convergence ability shifting towards the image plane of the optical photographing lens assembly with the positive refractive power of the second lens element so as to keep the optical photographing lens assembly compact. It is also favorable for obtaining a wider viewing angle. Moreover, the surface design of the third lens element is favorable for correcting the astigmatism and reducing the photosensitivity.

The fourth lens element can have positive refractive power, an object-side surface being concave in a paraxial region thereof and an image-side surface being convex in a paraxial region thereof. Therefore, it is favorable for further correcting the astigmatism and spherical aberration.

The fifth lens element can have negative refractive power and has an image-side surface being concave in a paraxial region thereof. Therefore, the principal point can be positioned away from the image plane of the optical photographing lens assembly so as to reduce the back focal length for keeping a compact size. Furthermore, at least one of the object-side surface and the image-side surface of the fifth lens element has at least one inflection point, so that it is favorable for correcting aberration of the off-axis.

When an axial distance between the object-side surface of the first lens element and the image plane is TL, and a maximum image height of the optical photographing lens assembly (half of a diagonal length of an effective photosensitive area of an image sensor) is ImgH, the following condition satisfied: $0.8<TL/ImgH<2.5$. Therefore, it is favorable for reducing the total track length of the optical photographing lens assembly so as to keep a compact size.

When an Abbe number of the fourth lens element is V4, and an Abbe number of the fifth lens element is V5, the following condition is satisfied: $0.2<V5/V4<0.5$. Therefore, it is favorable for further correcting the chromatic aberration of the optical photographing lens assembly.

When a focal length of the optical photographing lens assembly is f, a focal length of the first lens element is f1 a focal length of the second lens element is f2, a focal length of the third lens element is f3, a focal length of the fourth lens element is f4, and a focal length of the fifth lens element is f5, the following condition is satisfied: $0<(|f/f1|+|f/f2|+|f/f3|)/(|f/f4|+|f/f5|)<0.6$. Therefore, it is favorable for reducing the total track length of the optical photographing lens assembly so as to keep a compact size thereof and reduce its photosensitivity.

The aforementioned optical photographing lens assembly further includes a stop, such as an aperture stop, wherein an axial distance between the stop and the image-side surface of the fifth lens element is SD, and an axial distance between the object-side surface of the first lens element and the image-side surface of the fifth lens element is TD, the following condition is satisfied: $0.8<SD/TD<1.1$. Therefore, it is favorable for making a balance between obtaining the telecentricity and the wide viewing angle.

When the focal length of the optical photographing lens assembly is f, and a curvature radius of the image-side surface of the third lens element is R6, the following condition is satisfied: $0<f/R6<2.0$. Therefore, it is favorable for correcting astigmatism of the optical photographing lens assembly.

When a curvature radius of the image-side surface of the fifth lens element is R10, and a vertical distance between a non-axial critical point on the image-side surface of the fifth lens element and an optical axis is Yc52, the following condition is satisfied: $0<R10/Yc52<3.5$. Therefore, it is favorable for effectively correcting the aberration of the off-axis.

When an axial distance between the second lens element and the third lens element is T23, an axial distance between the third lens element and the fourth lens element is T34, and an axial distance between the fourth lens element and the fifth lens element is T45, the following condition is satisfied:

0<(T23+T45)/T34<1.0. Therefore, it is favorable for properly adjusting the axial distance between every lens elements so as to reduce the total track length for keeping the optical photographing lens assembly compact. Preferably, the following condition is satisfied: 0<(T23+T45)/T34<0.75.

When half of a maximal field of view of the optical photographing lens assembly is HFOV, and the following condition is satisfied: 0.80<1/tan(HFOV)<1.40. Therefore, it is favorable for enlarging the field of view so as to obtain a larger image scene.

When the focal length of the second lens element is f2, and the focal length of the third lens element is f3, the following condition is satisfied: 0<f2/f3<10. Therefore, it is favorable for the light convergence ability shifting towards the image plane of the optical photographing lens assembly so as to keep the optical photographing lens assembly compact and obtain a wider viewing angle.

According to the optical photographing lens assembly of the present disclosure, the lens elements thereof can be made of glass or plastic material. When the lens elements are made of glass material, the distribution of the refractive power of the optical photographing lens assembly may be more flexible to design. When the lens elements are made of plastic material, the manufacturing cost can be effectively reduced. Furthermore, surfaces of each to lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical photographing lens assembly can also be reduced.

According to the optical photographing lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical photographing lens assembly of the present disclosure, the optical photographing lens assembly can include at least one stop, such as an aperture stop, a glare stop or a field stop. Said glare stop or said field stop is for eliminating the stray light and thereby improving the image resolution thereof.

According to the optical photographing lens assembly of the present disclosure, an aperture stop can be configured as a front stop or a middle stop. A front stop disposed between an imaged object and the first lens element can provide a longer distance between an exit pupil of the optical photographing lens assembly and the image plane and thereby improves the image-sensing efficiency of an image sensor. A middle stop disposed between the first lens element and the image plane is favorable for enlarging the field of view of the optical photographing lens assembly and thereby provides a wider field of view for the same.

According to the optical photographing lens assembly of the present disclosure, critical point is a non-axial point of a lens surface where its tangent is perpendicular to an optical axis.

The present optical photographing lens assembly can be optionally applied to moving focus optical systems. According to the optical photographing lens assembly of the present disclosure, the optical photographing lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the optical photographing lens assembly according to the aforementioned optical photographing lens assembly of the present disclosure, and an image sensor, wherein the image sensor is disposed on an image plane of the aforementioned optical photographing lens assembly. Therefore the image capturing device can obtain wide viewing angle and maintain a compact size. Preferably, the image capturing device can further include a barrel member, a holding member or a combination thereof.

According to the present disclosure, a mobile terminal is, provided, wherein the mobile terminal includes the aforementioned image capturing device. Therefore, it is favorable for the mobile terminal obtaining good image quality. Preferably, the mobile terminal can further include but not limited to display, control unit, random access memory unit (RAM) a read only memory unit (ROM) or a combination thereof.

According to the above description of the present disclosure, the following 1st-13th specific embodiments are provided for further explanation.

1st Embodiment

Figure 2:
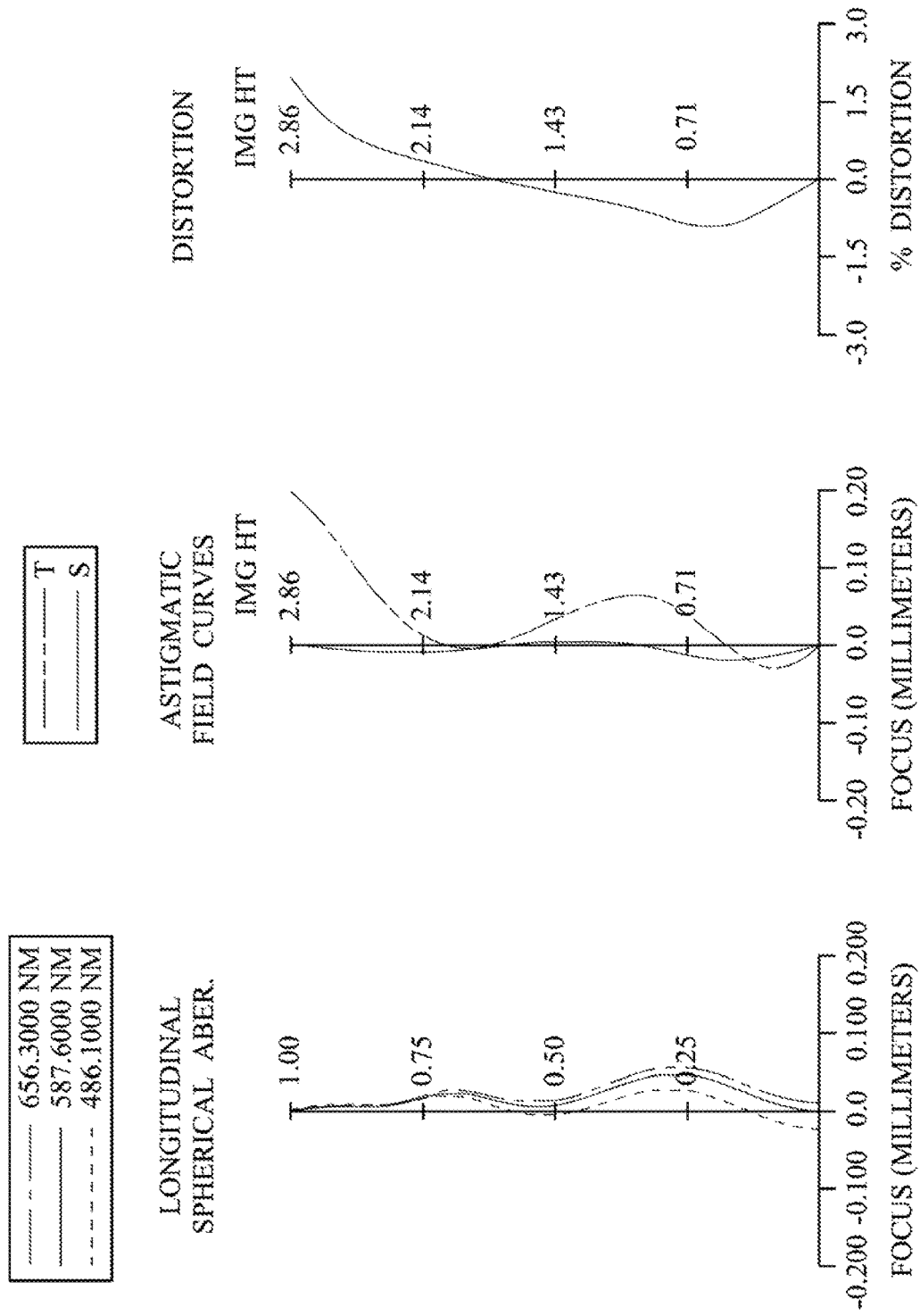
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve, of the image capturing device according to the 1st embodiment.

In FIG. 1, the image capturing device includes the optical photographing lens assembly (not otherwise herein labeled) of the present disclosure and an image sensor 180. The optical photographing lens assembly includes, in order from an object side to an image side, an aperture stop 100, a first lens element 110, a second lens element 120, a third lens element 130, a fourth lens element 140, a fifth lens element 150, an IR-cut filter 160 and an image plane 170, wherein the optical photographing lens assembly has a total of five lens elements (110-150) with refractive power.

The first lens element 110 with positive refractive power has an object-side surface 111 being convex in a paraxial region thereof and an image-side surface 112 being concave in a paraxial region thereof, and is made of plastic material. The object-side surface 111 and the image-side surface 112 of the first lens element 110 are aspheric.

The second lens element 120 with positive refractive power has an object-side surface 121 being convex in a paraxial region thereof and an image-side surface 122 being concave in a paraxial region thereof, and is made of plastic material. The object-side surface 121 and the image-side surface 122 of the second lens element 120 are aspheric.

The third lens element 130 with positive refractive power has an object-side surface 131 being convex in a paraxial region thereof and an image-side surface 132 being concave in a paraxial region thereof, and is made of plastic material. The object-side surface 131 and the image-side surface 132 of the third lens element 130 are aspheric.

The fourth lens element 140 with positive refractive power has an object-side surface 141 being concave in a paraxial region thereof and an image-side surface 142 being convex in a paraxial region thereof, and is made of plastic material. The object-side surface 141 and the image-side surface 142 of the fourth lens element 140 are aspheric.

The fifth lens element 150 with negative refractive power has an object-side surface 151 being convex in a paraxial region thereof and an image-side surface 152 being concave in a paraxial region thereof, and is made of plastic material. The object-side surface 151 and the image-side surface 152 of the fifth lens element 150 are aspheric. Furthermore, both of the object-side surface 151 and the image-side surface 152 of the fifth lens element 150 have at least one inflection point.

The IR-cut filter 160 is made of glass and located between the fifth lens element 150 and the image plane 170, and will not affect the focal length of the optical photographing lens assembly. The image sensor 180 is disposed on the image plane 170 of the optical photographing lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing lens assembly of the image capturing device according to the 1st embodiment, when a focal length of the optical photographing lens assembly is f, an f-number of the optical photographing lens assembly is Fno, and half of a maximal field of view of the optical photographing lens assembly is HFOV, these parameters have the following values: f=3.33 mm; Fno=2.04; and HFOV=40.0 degrees.

In the optical photographing lens assembly of the image capturing device according to the 1st embodiment, when an Abbe number of the fourth lens element 140 is V4, and an Abbe number of the fifth lens element 150 is V5, the following condition is satisfied: V5/V4=0.42.

In the optical photographing lens assembly according to the 1st embodiment an axial distance between the second lens element 120 and the third lens element 130 is T23, an axial distance between the third lens element to 130 and the fourth lens element 140 is T34, and an axial distance between the fourth lens element 140 and the fifth lens element 150 is T45, the following condition is satisfied: (T23+T45)/T34=0.16.

In the optical photographing lens assembly of the image capturing device according to the 1st embodiment, when the focal length of the optical photographing lens assembly is f, and a curvature radius of the image-side surface 132 of the third lens element 130 is R6, the following condition is satisfied; f/R6=0.81.

In the optical photographing lens assembly of the image capturing device according to the 1st embodiment, when the focal length of the optical photographing lens assembly is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following conditions are satisfied: f2/f3=0.12; and (|f/f1|+|f/f2|+|f/f3|)/(|f/f4|+|f/f5|)=0.24.

Figure 21:
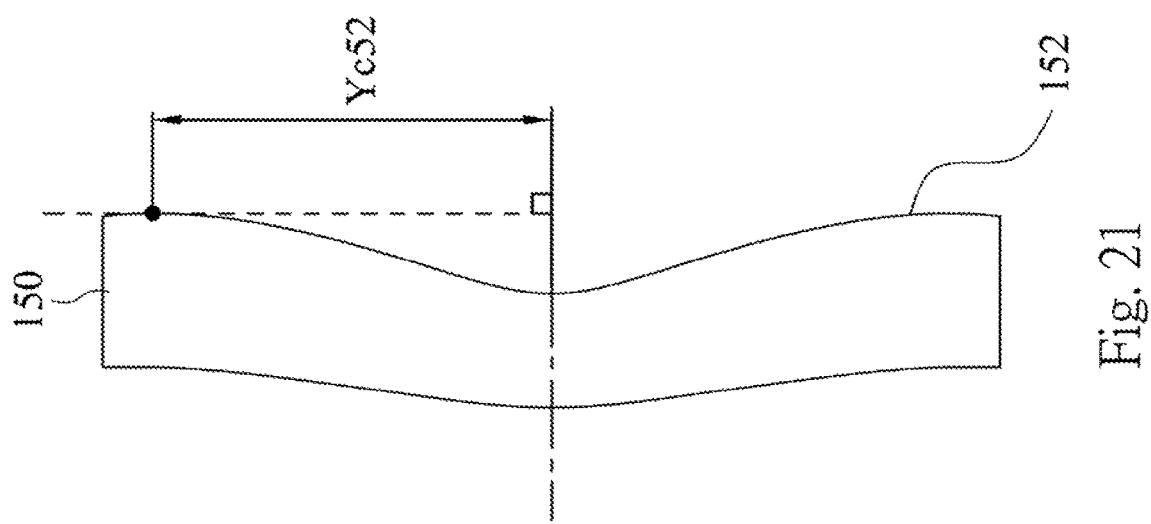
FIG. 21 shows Yc52 of the fifth lens element according to the FIG. 1.

FIG. 21 shows Yc52 of the fifth lens element 150 according to the FIG. 1. In FIG. 21, a curvature radius of the image-side surface 152 of the fifth lens element 150 is R10, and a vertical distance between a non-axial critical point on the image-side surface 152 of the fifth lens element 150 and an optical axis is Yc52, the following condition is satisfied: R10/Yc52=0.45.

In the optical photographing lens assembly according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following condition is satisfied: SD/TD=0.94.

In the optical photographing lens assembly of the image capturing device according to the 1st embodiment, when half of a maximal field of view of the optical photographing lens assembly is HFOV, the following condition is satisfied: 1/tan(HFOV)=1.19.

In the optical photographing lens assembly according to the 1st embodiment, when an axial distance between the object-side surface 111 of the first lens element 110 and the image plane 170 is TL, and a maximum image height of the optical photographing lens assembly (half of a diagonal length of an effective photosensitive area of the image sensor 180) is ImgH, the following condition is satisfied: TL/ImgH=1.61.

The detailed optical data of the 1st embodiment are shown in Table 1 and the aspheric surface data are shown in Table 2 below.

TABLE 1

Embodiment 1
f = 3.33 mm, Fno = 2.04, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.180 | | | | |
| 2 | Lens 1 | 1.586 | ASP | 0.405 | Plastic | 1.544 | 55.9 | 7.97 |
| 3 | | 2.275 | ASP | 0.208 | | | | |
| 4 | Lens 2 | 4.022 | ASP | 0.359 | Plastic | 1.544 | 55.9 | 11.15 |
| 5 | | 11.552 | ASP | 0.050 | | | | |
| 6 | Lens 3 | 3.971 | ASP | 0.344 | Plastic | 1.640 | 23.3 | 95.78 |
| 7 | | 4.103 | ASP | 0.498 | | | | |
| 8 | Lens 4 | −1.409 | ASP | 0.640 | Plastic | 1.544 | 55.9 | 2.05 |

TABLE 1-continued

Embodiment 1
f = 3.33 mm, Fno = 2.04, HFOV = 40.0 deg.

| Surface # | | Curvature Radius | | Thickness | Material | Index | Abbe # | Focal Length |
|---|---|---|---|---|---|---|---|---|
| 9 | | −0.722 | ASP | 0.030 | | | | |
| 10 | Lens 5 | 3.073 | ASP | 0.586 | Plastic | 1.640 | 23.3 | −2.28 |
| 11 | | 0.915 | ASP | 0.700 | | | | |
| 12 | IR-cut filter | Plano | | 0.210 | Glass | 1.517 | 64.2 | — |
| 13 | | Plano | | 0.570 | | | | |
| 14 | Image | Plano | | — | | | | |

Note:
Reference wavelength is 587.6 nm (d-line).

TABLE 2

| Aspheric Coefficients | | | | | |
|---|---|---|---|---|---|
| Surface # | 2 | 3 | 4 | 5 | 6 |
| k = | −3.5588E+00 | −6.2411E−01 | −5.3221E+01 | −1.0000E+00 | −1.6869E+01 |
| A4 = | 7.8195E−03 | −8.5375E−02 | 3.2756E−02 | −3.5685E−01 | −4.1969E−01 |
| A6 = | 7.4731E−01 | 7.5020E−02 | −4.0936E−01 | −8.3747E−01 | 2.5113E−01 |
| A8 = | −3.8195E+00 | −1.1970E+00 | 6.6153E−01 | 5.8941E+00 | −7.7146E−01 |
| A10 = | 8.8762E+00 | 2.5136E+00 | −2.5465E+00 | −1.9467E+01 | 2.0137E+00 |
| A12 = | −1.0140E+01 | −3.0208E+00 | 3.8917E+00 | 3.5122E+01 | −1.4137E+00 |
| A14 = | 4.4155E+00 | 1.5649E+00 | −1.6682E+00 | −3.0856E+01 | 5.7490E−02 |
| A16 = | | | | 1.0364E+01 | −5.1326E−02 |

| Surface # | 7 | 8 | 9 | 10 | 11 |
|---|---|---|---|---|---|
| k = | 1.0373E+00 | −1.3412E+00 | −1.8997E+00 | 5.1963E−01 | −7.1100E+00 |
| A4 = | −6.1095E−02 | 7.5191E−03 | 8.9705E−02 | −9.8671E−02 | −4.2660E−02 |
| A6 = | −1.2725E−01 | −2.2720E−01 | −4.3772E−01 | 4.9581E−02 | 1.6306E−02 |
| A8 = | 3.6719E−01 | 5.4957E−01 | 6.5161E−01 | −2.0483E−02 | −4.1897E−03 |
| A10 = | −4.9184E−01 | −4.3724E−01 | −5.8677E−01 | 5.5017E−03 | 5.4025E−04 |
| A12 = | 4.2197E−01 | 1.3973E−01 | 3.9083E−01 | −9.0968E−04 | −1.0303E−05 |
| A14 = | −2.1912E−01 | 2.0262E−02 | −1.5054E−01 | 8.1938E−05 | −4.9109E−06 |
| A16 = | 4.8360E−02 | −2.1087E−02 | 2.3028E−02 | −3.1678E−06 | 3.7124E−07 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. This information related to Table 1 and Table 2 applies also to the Tables for the remaining embodiments, and so an explanation in this regard will not be provided again.

2nd Embodiment

Figure 3:
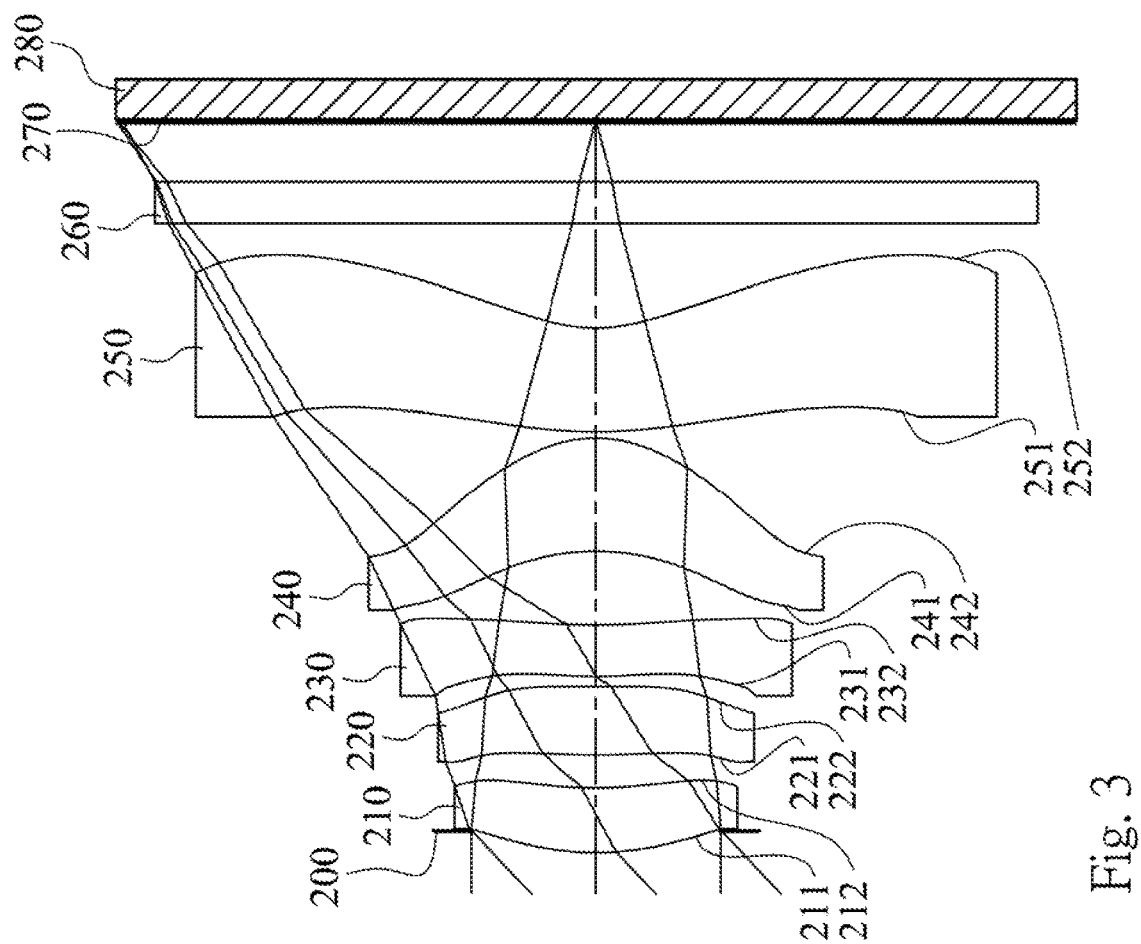
FIG. 3 is a schematic view of an image capturing device according to the 2nd embodiment of the present disclosure.
Figure 4:
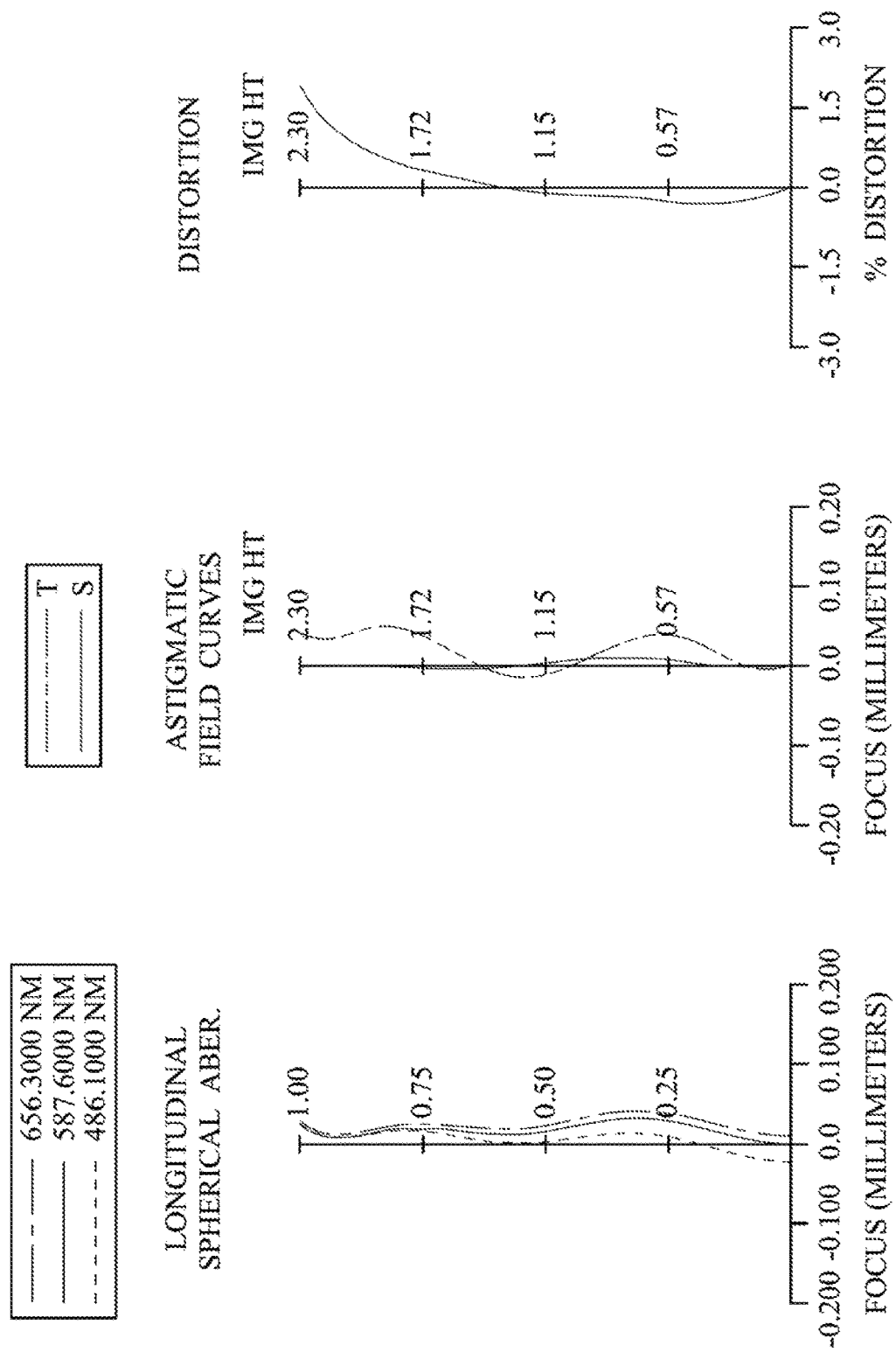
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the optical photographing lens assembly (not otherwise herein labeled) of the present disclosure and an image sensor 280. The optical photographing lens assembly includes, in order from an object side to an image side, an aperture stop 200, a first lens element 210, a second lens element 220, a third lens element 230, a fourth lens element 240, a fifth lens element 250, an IR-cut filter 260 and an image plane 270, wherein the optical photographing lens assembly has a total of five lens elements (210-250) with refractive power.

The first lens element 210 with positive refractive power has an object-side surface 211 being convex in a paraxial region thereof and an image-side surface 212 being concave in a paraxial region thereof, and is made of plastic material. The object-side surface 211 and the image-side surface 212 of the first lens element 210 are aspheric.

The second lens element 220 with positive refractive power has an object-side surface 221 being convex in a paraxial region thereof and an image-side surface 222 being concave in a paraxial region thereof, and is made of plastic material. The object-side surface 221 and the image-side surface 222 of the second lens element 220 are aspheric.

The third lens element 230 with positive refractive power has an object-side surface 231 being convex in a paraxial region thereof and an image-side surface 232 being concave in a paraxial region thereof, and is made of plastic material. The object-side surface 231 and the image-side surface 232 of the third lens element 230 are aspheric.

The fourth lens element 240 with positive refractive power has an object-side surface 241 being concave in a paraxial region thereof and an image-side surface 242 being convex in a paraxial region thereof, and is made of plastic material. The object-side surface 241 and the image-side surface 242 of the fourth lens element 240 are aspheric.

The fifth lens element 250 with negative refractive power has an object-side surface 251 being convex in a paraxial region thereof and an image-side surface 252 being concave in a paraxial region thereof, and is made of plastic material. The object-side surface 251 and the image-side surface 252 of the fifth lens element 250 are aspheric. Furthermore, both of the abject-side surface 251 and the image-side surface 252 of the fifth lens element 250 have at least one inflection point.

The IR-cut filter 260 is made of glass and located between the fifth lens element 250 and the image plane 270, and will not affect the focal length of the optical photographing lens assembly. The image sensor 280 is disposed on the image plane 270 of the optical photographing lens assembly.

The detailed optical data of the 2nd embodiment are shown in Table 3 and the aspheric surface data are shown in Table 4 below.

from Table 3 and Table 4 as the following values and satisfy the following conditions:

| 2nd Embodiment | | | |
|---|---|---|---|
| f [mm] | 2.33 | f2/f3 | 1.44 |
| Fno | 1.95 | (|f/f1| + |f/f2| + |f/f3|)/(|f/f4| + |f/f5|) | 0.30 |
| HFOV [deg.] | 43.9 | R10/Yc52 | 0.47 |
| V5/V4 | 0.38 | SD/TD | 0.96 |
| (T23 + T45)/T34 | 0.23 | 1/tan(HFOV) | 1.04 |
| f/R6 | 0.67 | TL/ImgH | 1.53 |

TABLE 3

Embodiment 2
f = 2.33 mm, Fno = 1.95, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.104 | | | | |
| 2 | Lens 1 | 1.395 | ASP | 0.307 | Plastic | 1.565 | 56.0 | 6.13 |
| 3 | | 2.150 | ASP | 0.157 | | | | |
| 4 | Lens 2 | 4.389 | ASP | 0.329 | Plastic | 1.565 | 56.0 | 13.91 |
| 5 | | 9.672 | ASP | 0.050 | | | | |
| 6 | Lens 3 | 2.309 | ASP | 0.246 | Plastic | 1.650 | 21.4 | 9.67 |
| 7 | | 3.497 | ASP | 0.355 | | | | |
| 8 | Lens 4 | −1.124 | ASP | 0.541 | Plastic | 1.565 | 56.0 | 1.68 |
| 9 | | −0.604 | ASP | 0.030 | | | | |
| 10 | Lens 5 | 2.238 | ASP | 0.499 | Plastic | 1.650 | 21.4 | −1.87 |
| 11 | | 0.717 | ASP | 0.500 | | | | |
| 12 | IR-cut filter | Plano | | 0.200 | Glass | 1.517 | 64.2 | — |
| 13 | | Plano | | 0.289 | | | | |
| 14 | Image | Plano | | — | | | | |

Note:
Reference wavelength is 587.6 nm (d-line).

TABLE 4

Aspheric Coefficients

| Surface # | 2 | 3 | 4 | 5 | 6 |
|---|---|---|---|---|---|
| k = | −4.2159E+00 | −3.0932E+00 | −5.0000E+01 | −3.0000E+01 | −2.0113E+01 |
| A4 = | −3.5348E−02 | −2.0596E−01 | −1.0512E−01 | −8.6753E−01 | −8.3937E−01 |
| A6 = | 2.1374E+00 | 2.5432E−01 | −1.1107E+00 | −2.2685E+00 | 6.6236E−01 |
| A8 = | −1.7216E+01 | −5.7272E+00 | 2.9119E+00 | 2.7387E+01 | −3.5489E+00 |
| A10 = | 6.3492E+01 | 1.7729E+01 | −1.8631E+01 | −1.3962E+02 | 1.4556E+01 |
| A12 = | −1.1854E+02 | −3.2510E+01 | 4.8564E+01 | 3.8856E+02 | −1.5651E+01 |
| A14 = | 8.5298E+01 | 2.8270E+01 | −3.4920E+01 | −5.3039E+02 | 8.2552E−01 |
| A16 = | | | | 2.7820E+02 | −1.3726E−01 |

| Surface # | 7 | 8 | 9 | 10 | 11 |
|---|---|---|---|---|---|
| k = | −9.3882E+00 | −9.6253E−01 | −1.7122E+00 | −3.3860E−01 | −6.0932E+00 |
| A4 = | −1.4576E−01 | 5.9688E−03 | 2.1060E−01 | −2.1018E−01 | −8.0830E−02 |
| A6 = | −3.8490E−01 | −5.6575E−01 | −1.3255E+00 | 1.5092E−01 | 4.4891E−02 |
| A8 = | 1.7632E+00 | 2.5774E+00 | 2.9934E+00 | −9.4103E−02 | −1.8409E−02 |
| A10 = | −3.4689E+00 | −3.1810E+00 | −4.1931E+00 | 3.8191E−02 | 3.6363E−03 |
| A12 = | 4.6578E+00 | 1.4731E+00 | 4.3472E+00 | −9.6880E−03 | −1.0283E−04 |
| A14 = | −3.8244E+00 | 3.1662E−01 | −2.5794E+00 | 1.5363E−03 | −7.7326E−05 |
| A16 = | 1.2242E+00 | −4.8689E−01 | 6.0631E−01 | −1.4966E−04 | 8.3050E−06 |

Figure 5:
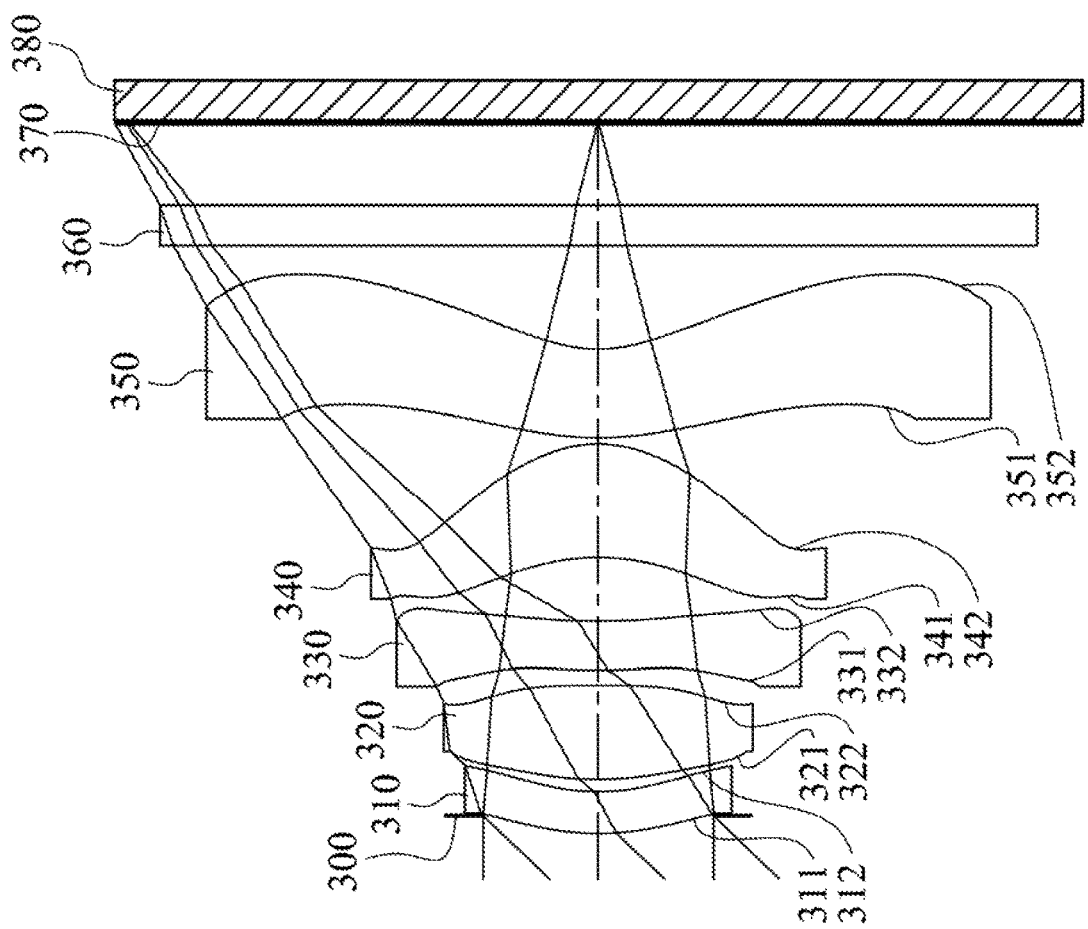
FIG. 5 is a schematic view of an image capturing device according to the 3rd embodiment of the present disclosure.
Figure 6:
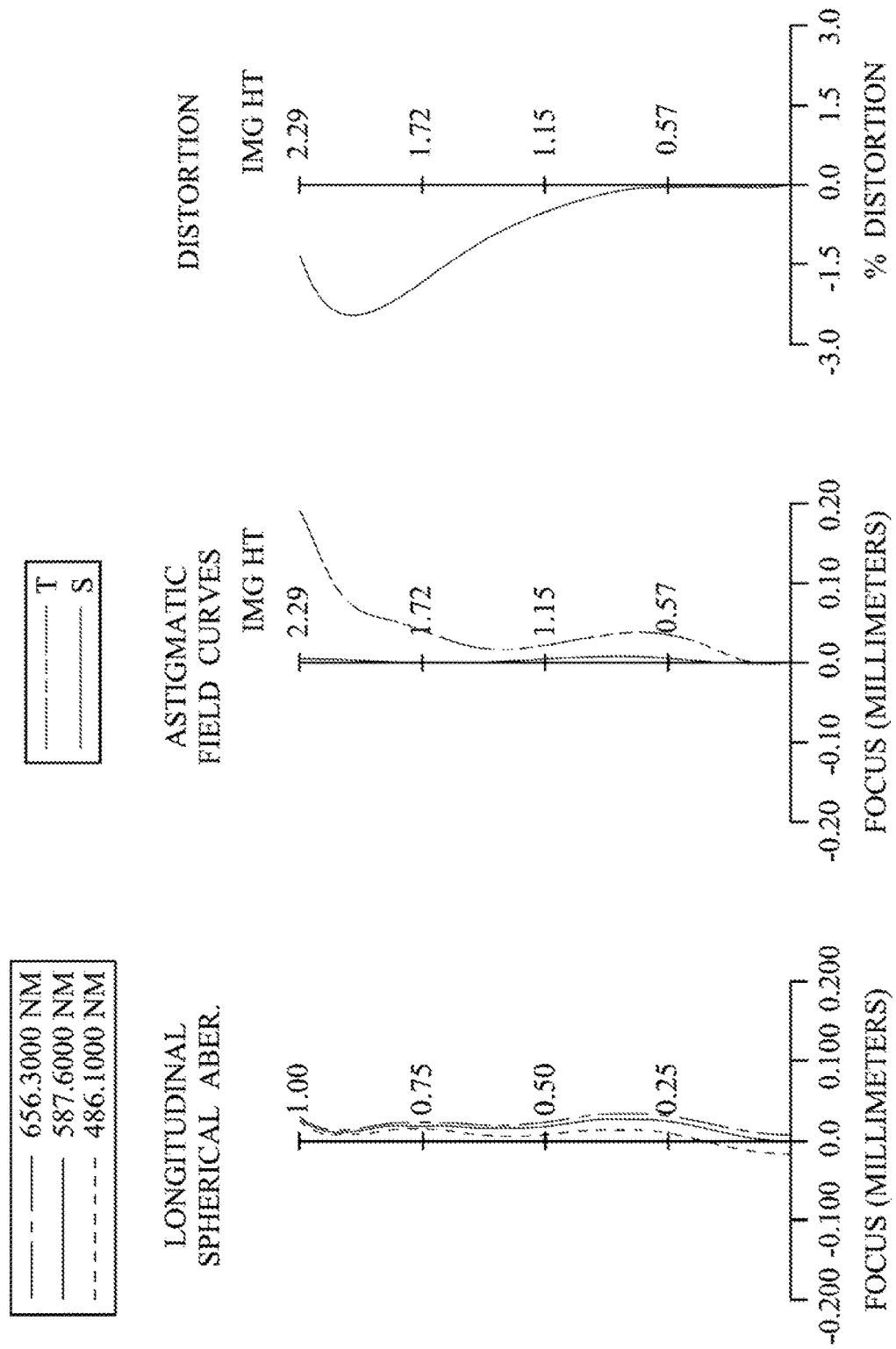
FIG. 6 shows spherical aberration curves, astigmatic field curves and a distortion curve of the image capturing device according to the 3rd embodiment.

In the optical photographing lens assembly according to the 2nd embodiment, the definitions of these parameters shown in the following table are the same as those stated in the 1st embodiment with corresponding values for the 2nd embodiment. Moreover, these parameters can be calculated 3rd Embodiment FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the optical photographing lens assembly (not otherwise herein labeled) of the present disclosure and an image sensor 380. The optical photographing lens assembly includes, in order from an object side to an image side, an aperture stop 300, a first lens element 310, a second lens element 320, a third lens element 330, a fourth lens element 340, a fifth lens element 350, an IR-cut filter 360 and an image plane 370, wherein the optical photographing lens assembly has a total of five lens elements (310-350) with refractive power.

The first lens element 310 with negative refractive power has an object-side surface 311 being convex in a paraxial region thereof and an image-side surface 312 being concave in a paraxial region thereof, and is made of plastic material. The object-side surface 311 and the image-side surface 312 of the first lens element 310 are aspheric.

The second lens element 320 with positive refractive power has an object-side surface 321 being convex in a paraxial region thereof and an image-side surface 322 being convex in a paraxial region thereof, and is made of plastic material. The object-side surface 321 and the image-side surface 322 of the second lens element 320 are aspheric.

The third lens element 330 with positive refractive power has an object-side surface 331 being convex in a paraxial region thereof and an image-side surface 332 being concave in a paraxial region thereof, and is made of plastic material. The object-side surface 331 and the image-side surface 332 of the third lens element 330 are aspheric.

The fourth lens element 340 with positive refractive power has an object-side surface 341 being concave in a paraxial region thereof and an image-side surface 342 being convex in a paraxial region thereof, and is made of plastic material. The object-side surface 341 and the image-side surface 342 of the fourth lens element 340 are aspheric.

The fifth lens element 350 with negative refractive power has an object-side surface 351 being convex in a paraxial region thereof and an image-side surface 352 being concave in a paraxial region thereof, and is made of plastic material. The object-side surface 351 and the image-side surface 352 of the fifth lens element 350 are aspheric. Furthermore, both of the object-side surface 351 and the image-side surface 352 of the fifth lens element 350 have at least one inflection point.

The IR-cut filter 360 is made of glass and located between the fifth lens element 350 and the image plane 370, and will not affect the focal length of the optical photographing lens assembly. The image sensor 380 is disposed on the image plane 370 of the optical photographing lens assembly.

The detailed optical data of the 3rd embodiment are shown in Table 5 and the aspheric surface data are shown in Table 6 below.

TABLE 5

Embodiment 3
f = 2.24 mm, Fno = 2.00, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.087 | | | | |
| 2 | Lens 1 | 1.321 | ASP | 0.200 | Plastic | 1.634 | 23.8 | −12.66 |
| 3 | | 1.068 | ASP | 0.059 | | | | |
| 4 | Lens 2 | 1.633 | ASP | 0.458 | Plastic | 1.544 | 55.9 | 2.75 |
| 5 | | −16.156 | ASP | 0.073 | | | | |
| 6 | Lens 3 | 2.545 | ASP | 0.242 | Plastic | 1.634 | 23.8 | 27.73 |
| 7 | | 2.866 | ASP | 0.309 | | | | |
| 8 | Lens 4 | −1.109 | ASP | 0.551 | Plastic | 1.544 | 55.9 | 1.77 |
| 9 | | −0.605 | ASP | 0.030 | | | | |
| 10 | Lens 5 | 1.563 | ASP | 0.433 | Plastic | 1.634 | 23.8 | −2.26 |
| 11 | | 0.668 | ASP | 0.500 | | | | |
| 12 | IR-cut filter | Plano | | 0.200 | Glass | 1.517 | 64.2 | — |
| 13 | | Plano | | 0.400 | | | | |
| 14 | Image | Plano | | — | | | | |

Note:
Reference wavelength is 587.6 nm (d-line).

TABLE 6

Aspheric Coefficients

| Surface # | 2 | 3 | 4 | 5 | 6 |
|---|---|---|---|---|---|
| k = | −4.6363E+00 | −3.0313E+00 | −9.3484E+00 | −1.0000E+00 | −2.4360E+01 |
| A4 = | −1.2640E−01 | −1.9354E−01 | 6.5019E−02 | −7.8642E−01 | −8.5403E−01 |
| A6 = | 1.7724E+00 | 5.7402E−01 | −6.4875E−01 | −1.8498E+00 | 7.0473E−01 |
| A8 = | −1.5884E+01 | −5.2979E+00 | 3.0692E+00 | 2.7380E+01 | −3.4275E+00 |
| A10 = | 6.5505E+01 | 1.7251E+01 | −1.8048E+01 | −1.4026E+02 | 1.4626E+01 |
| A12 = | −1.3450E+02 | −3.4500E+01 | 4.7554E+01 | 3.8816E+02 | −1.5789E+01 |
| A14 = | 1.0646E+02 | 3.3121E+01 | −3.8037E+01 | −5.2947E+02 | 4.6959E−01 |
| A16 = | | | | 2.7979E+02 | 1.8330E+00 |

| Surface # | 7 | 8 | 9 | 10 | 11 |
|---|---|---|---|---|---|
| k = | −9.5284E+00 | −1.6909E+00 | −1.6634E+00 | −1.4574E+00 | −5.0308E+00 |
| A4 = | −1.5992E−01 | 6.9984E−02 | 2.2081E−01 | −2.8250E−01 | −9.9311E−02 |

TABLE 6-continued

| Aspheric Coefficients | | | | | |
|---|---|---|---|---|---|
| A6 =  | −3.6516E−01 | −5.2422E−01 | −1.3391E+00 | 2.0098E−01 | 5.3256E−02 |
| A8 =  | 1.8321E+00  | 2.5500E+00  | 2.9991E+00  | −1.0425E−01 | −2.1846E−02 |
| A10 = | −3.4320E+00 | −3.2255E+00 | −4.1581E+00 | 3.4983E−02  | 4.3930E−03 |
| A12 = | 4.6443E+00  | 1.4508E+00  | 4.3751E+00  | −8.6239E−03 | −8.2704E−05 |
| A14 = | −3.8526E+00 | 3.2858E−01  | −2.5737E+00 | 2.0607E−03  | −1.2577E−04 |
| A16 = | 1.1591E+00  | −4.4618E−01 | 5.7891E−01  | −3.5258E−04 | 1.4203E−05 |

In the optical photographing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f [mm] | 2.24 | f2/f3 | 0.10 |
| Fno | 2.00 | ($|f/f1| + |f/f2| + |f/f3|$)/($|f/f4| + |f/f5|$) | 0.47 |
| HFOV [deg.] | 46.0 | R10/Yc52 | 0.46 |
| V5/V4 | 0.43 | SD/TD | 0.96 |
| (T23 + T45)/T34 | 0.33 | 1/tan(HFOV) | 0.97 |
| f/R6 | 0.78 | TL/ImgH | 1.51 |

4th Embodiment

Figure 7:
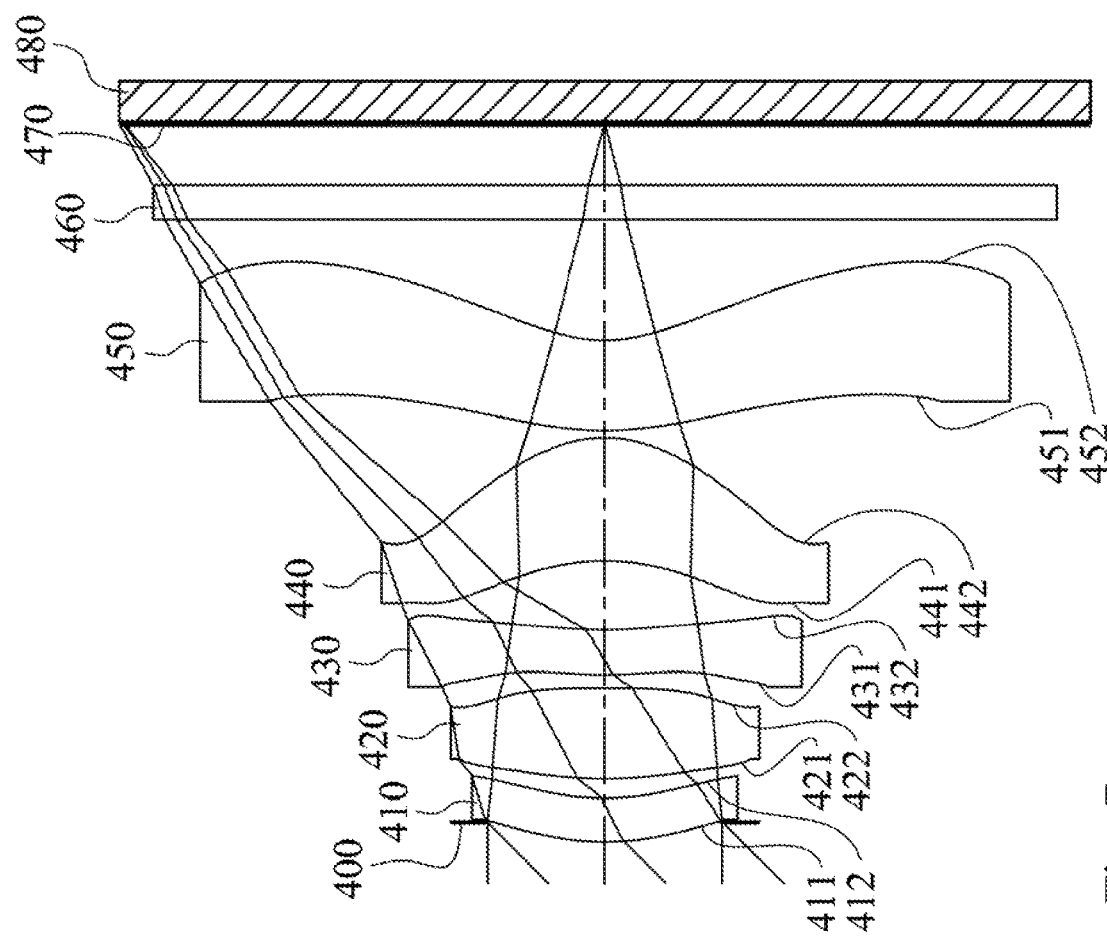
FIG. 7 is a schematic view of an image capturing device according to the 4th embodiment of the present disclosure.
Figure 8:
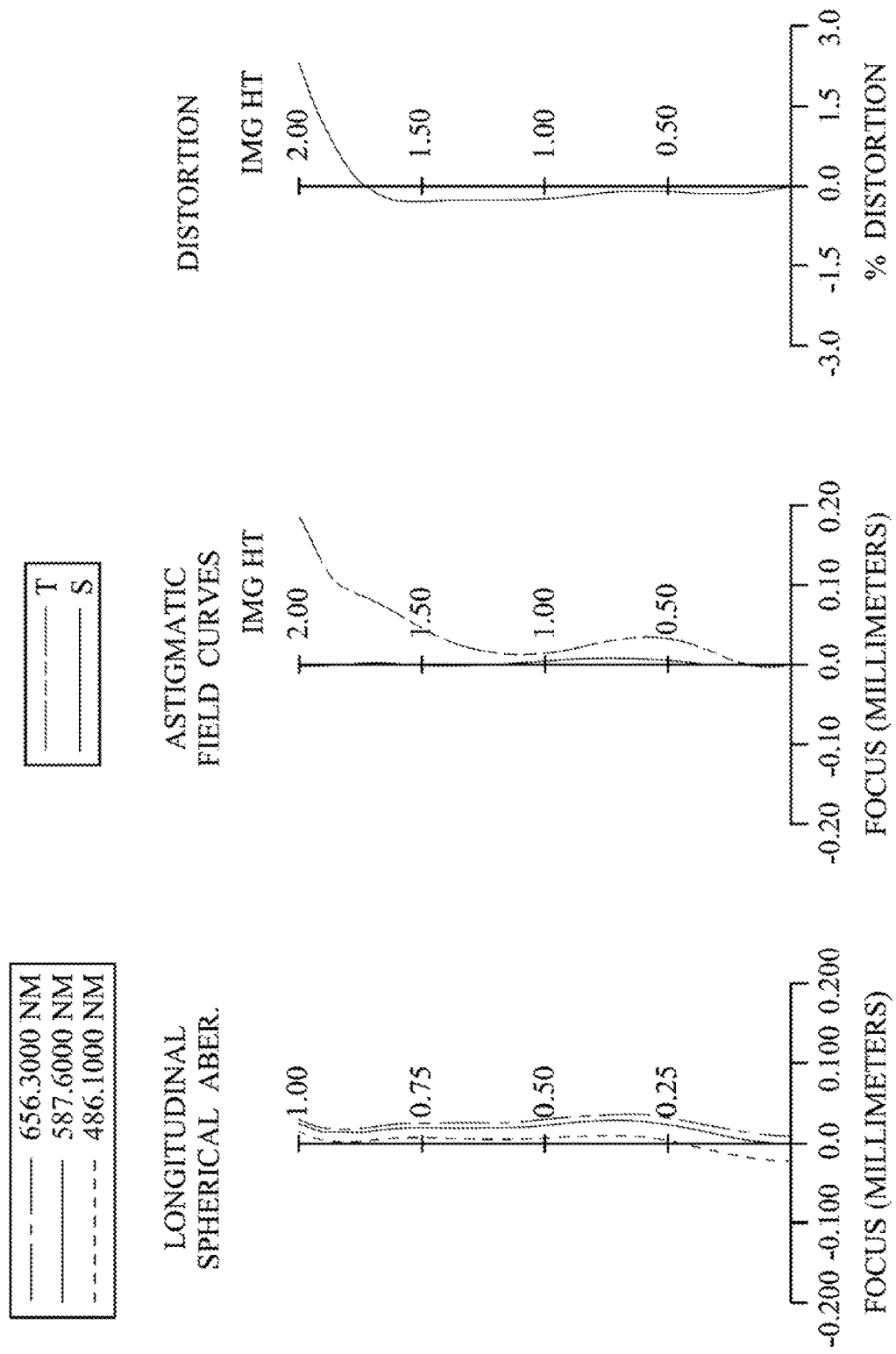
FIG. 8 shows spherical aberration curves astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment, In FIG. 7, the image capturing device includes the optical photographing lens assembly (not otherwise herein labeled) of the present disclosure and an image sensor 480. The optical photographing lens assembly includes, in order from an object side to an image side, an aperture stop 400, a first lens element 410, a second lens element 420, a third lens element 430, a fourth lens element 440, a fifth lens element 450, an IR-cut filter 460 and an image plane 470, wherein the optical photographing lens assembly has a total of five lens elements (410-450) with refractive power.

The first lens element 410 with positive refractive power has an object-side surface 411 being convex in a paraxial region thereof and an image-side surface 412 being concave in a paraxial region thereof, and is made of plastic material.

The object-side surface 411 and the image-side surface 412 of the first lens element 410 are aspheric.

The second lens element 420 with positive refractive power has an object-side surface 421 being convex in a paraxial region thereof and an image-side surface 422 being convex in a paraxial region thereof, and is made of plastic material. The object-side surface 421 and the image-side surface 422 of the second lens element 420 are aspheric.

The third lens element 430 with positive refractive power has an object-side surface 431 being convex in a paraxial region thereof and an image-side surface 432 being concave in a paraxial region thereof, and is made of plastic material. The object-side surface 431 and the image-side surface 432 of the third lens element 430 are aspheric.

The fourth lens element 440 with positive refractive power has an object-side surface 441 being concave in a paraxial region thereof and an image-side surface 442 being convex in a paraxial region thereof, and is made of plastic material. The object-side surface 441 and the image-side surface 442 of the fourth lens element 440 are aspheric.

The fifth lens element 450 with negative refractive power has an object-side surface 451 being convex in a paraxial region thereof and an image-side surface 452 being concave in a paraxial region thereof, and is made of plastic material. The object-side surface 451 and the image-side surface 452 of the fifth lens element 450 are aspheric. Furthermore, both of the object-side surface 451 and the image-side surface 452 of the fifth lens element 450 have at least one inflection point.

The IR-cut filter 460 is made of glass and located between the fifth lens element 450 and the image plane 470, and will not affect the focal length of the optical photographing lens assembly. The image sensor 480 is disposed on the image plane 470 of the optical photographing lens assembly.

The detailed optical data of the 4th embodiment are shown in Table 7 and the aspheric surface data are shown in Table 8 below.

TABLE 7

Embodiment 4
f = 1.95 mm, Fno = 2.00, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.081 | | | | |
| 2 | Lens 1 | 1.156 | ASP | 0.180 | Plastic | 1.640 | 23.3 | 65.92 |
| 3 | | 1.116 | ASP | 0.079 | | | | |
| 4 | Lens 2 | 1.774 | ASP | 0.378 | Plastic | 1.544 | 55.9 | 3.20 |
| 5 | | −92.674 | ASP | 0.055 | | | | |
| 6 | Lens 3 | 1.918 | ASP | 0.189 | Plastic | 1.640 | 23.3 | 14.83 |
| 7 | | 2.311 | ASP | 0.287 | | | | |
| 8 | Lens 4 | −0.955 | ASP | 0.511 | Plastic | 1.544 | 55.9 | 1.53 |
| 9 | | −0.528 | ASP | 0.030 | | | | |
| 10 | Lens 5 | 1.387 | ASP | 0.376 | Plastic | 1.640 | 23.3 | −1.87 |

TABLE 7-continued

Embodiment 4
f = 1.95 mm, Fno = 2.00, HFOV = 44.9 deg.

| Surface # | | Curvature Radius | | Thickness | Material | Index | Abbe # | Focal Length |
|---|---|---|---|---|---|---|---|---|
| 11 | | 0.574 | ASP | 0.500 | | | | |
| 12 | IR-cut filter | Plano | | 0.145 | Glass | 1.517 | 64.2 | — |
| 13 | | Plano | | 0.256 | | | | |
| 14 | Image | Plano | | — | | | | |

Note:
Reference wavelength is 587.6 nm (d-line).

TABLE 8

| Aspheric Coefficients | | | | | |
|---|---|---|---|---|---|
| Surface # | 2 | 3 | 4 | 5 | 6 |
| k= | −3.3385E+00 | −2.0727E+00 | −1.1106E+01 | −1.0000E+00 | −2.1186E+01 |
| A4= | −1.4504E−01 | −2.5907E−01 | 4.1189E−02 | −1.2858E+00 | −1.2675E+00 |
| A6= | 3.5661E+00 | 8.8575E−01 | −1.3765E+00 | −3.6091E+00 | 1.4213E+00 |
| A8= | −4.1444E+01 | −1.4312E+01 | 7.9370E+00 | 7.1696E+01 | −9.0384E+00 |
| A10= | 2.2395E+02 | 6.1302E+01 | −6.2142E+01 | −4.8411E+02 | 5.0259E+01 |
| A12= | −6.1485E+02 | −1.5018E+02 | 2.2127E+02 | 1.7637E+03 | −7.2004E+01 |
| A14= | 6.6034E+02 | 1.8188E+02 | −2.3498E+02 | −3.1652E+03 | 2.8704E+00 |
| A16= | | | | 2.2047E+03 | 1.7348E+01 |
| Surface # | 7 | 8 | 9 | 10 | 11 |
| k= | −6.4658E+00 | −1.4273E+00 | −1.6985E+00 | −1.5461E+00 | −5.0911E+00 |
| A4= | −2.4364E−01 | 9.3217E−02 | 3.5563E−01 | −4.2071E−01 | −1.5382E−01 |
| A6= | −7.4223E−01 | −1.0174E+00 | −2.6745E+00 | 4.1030E−01 | 1.1245E−01 |
| A8= | 4.8157E+00 | 6.7144E+00 | 7.8254E+00 | −2.7531E−01 | −5.2424E−02 |
| A10= | −1.1846E+01 | −1.1106E+01 | −1.4362E+01 | 1.1979E−01 | 9.4720E−03 |
| A12= | 2.1046E+01 | 6.5926E+00 | 1.9872E+01 | −3.9692E−02 | 5.0227E−04 |
| A14= | −2.3087E 1 | 1.9267E+00 | −1.5376E+01 | 1.2000E−02 | −2.5080E−04 |
| A16= | 9.0714E+00 | −3.6365E+00 | 4.5947E+00 | −2.1554E−03 | −8.4759E−06 |

In the optical photographing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f [mm] | 1.95 | f2/f3 | 0.22 |
| Fno | 2.00 | (|f/f1| + |f/f2| + |f/f3|)/(|f/f4| + |f/f5|) | 0.33 |
| HFOV [deg.] | 44.9 | R10/Yc52 | 0.44 |
| V5/V4 | 0.42 | SD/TD | 0.96 |
| (T23 + T45)/T34 | 0.30 | 1/tan(HFOV) | 1.00 |
| f/R6 | 0.84 | TL/ImgH | 1.49 |

5th Embodiment

Figure 9:
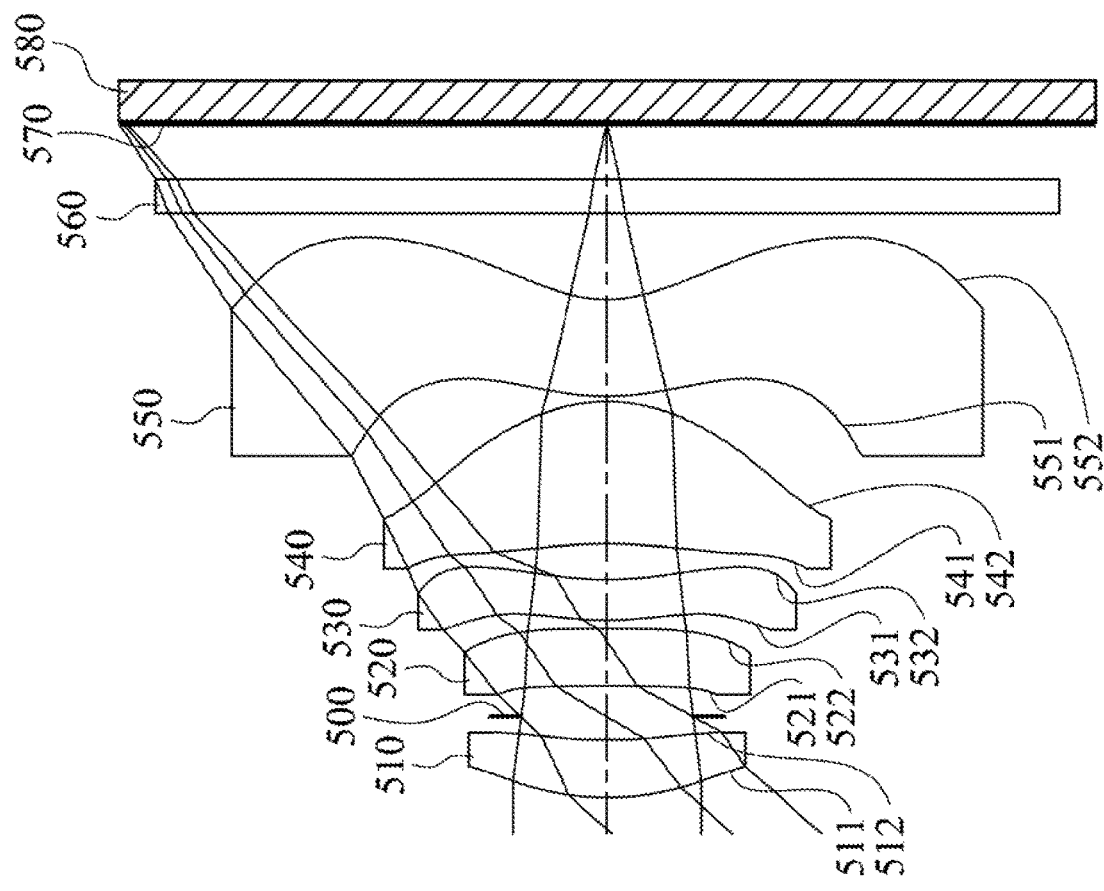
FIG. 9 is a schematic view of an image capturing device according to the 5th embodiment of the present disclosure.
Figure 10:
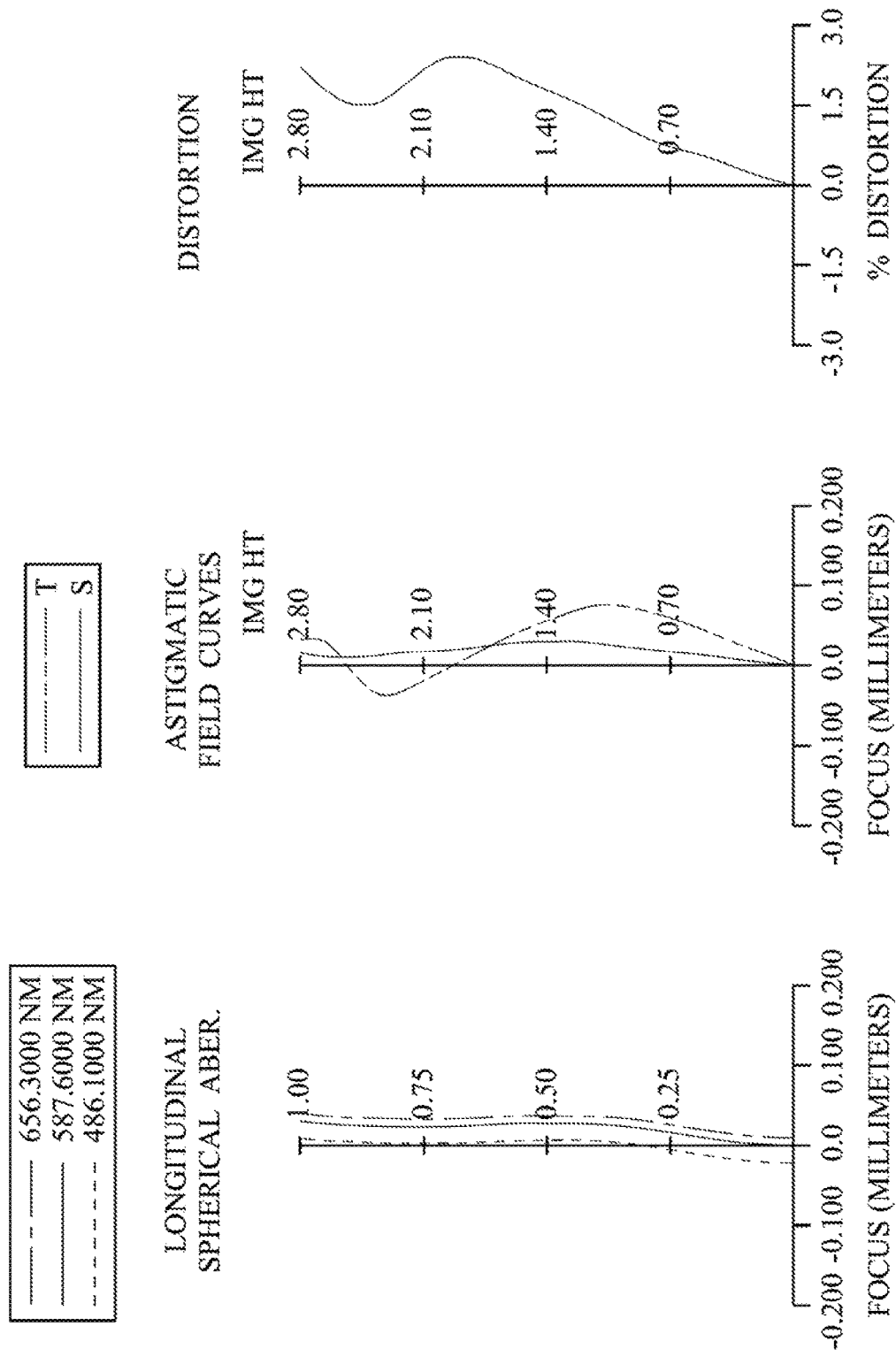
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the optical photographing to lens assembly (not otherwise herein labeled) of the present disclosure and an image sensor 580. The optical photographing lens assembly includes, in order from an object side to an image side, a first lens element 510, an aperture stop 500, a second lens element 520, a third lens element 530, a fourth lens element 540, a fifth lens element 550, an IR-cut filter 560 and an image plane 570, wherein the optical photographing lens assembly has a total of five lens elements (510-550) with refractive power.

The first lens element 510 with positive refractive power has an object-side surface 511 being convex in a paraxial region thereof and an image-side surface 512 being concave in a paraxial region thereof, and is made of plastic material. The object-side surface 511 and the image-side surface 512 of the first lens element 510 are aspheric.

The second lens element 520 with positive refractive power has an object-side surface 521 being concave in a paraxial region thereof and an image-side surface 522 being convex in a paraxial region thereof, and is made of plastic material. The object-side surface 521 and the image-side surface 522 of the second lens element 520 are aspheric.

The third lens element 530 with positive refractive power has an object-side surface 531 being convex in a paraxial region thereof and an image-side surface 532 being concave in a paraxial region thereof, and is made of plastic material. The object-side surface 531 and the image-side surface 532 of the third lens element 530 are aspheric.

The fourth lens element 540 with positive refractive power has an object-side surface 541 being concave in a paraxial region thereof and an image-side surface 542 being convex in a paraxial region thereof, and is made of plastic material. The object-side surface 541 and the image-side surface 542 of the fourth lens element 540 are aspheric.

The fifth lens element 550 with negative refractive power has an object-side surface 551 being convex in a paraxial region thereof and an image-side surface 552 being concave in a paraxial region thereof, and is made of plastic material. The object-side surface 551 and the image-side surface 552 of the fifth lens element 550 are aspheric. Furthermore, both of the object-side surface 551 and the image-side surface 552 of the fifth lens element 550 have at least one inflection point.

The IR-cut filter 560 is made of glass and located between the fifth lens element 550 and the image plane 570, and will not affect the focal length of the optical photographing lens assembly. The image sensor 580 is disposed on the image plane 570 of the optical photographing lens assembly.

The detailed optical data of the 5th embodiment are shown in Table 9 and the aspheric surface data are shown in Table 10 below.

In the optical photographing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f [mm] | 2.40 | f2/f3 | 2.72 |
| Fno | 2.20 | (|f/f1| + |f/f2| + |f/f3|)/(|f/f4| + |f/f5|) | 0.35 |
| HFOV [deg.] | 48.5 | R10/Yc52 | 0.56 |
| V5/V4 | 0.38 | SD/TD | 0.84 |
| (T23 + T45)/T34 | 0.39 | 1/tan(HFOV) | 0.88 |
| f/R6 | 1.13 | TL/ImgH | 1.40 |

TABLE 9

Embodiment 5
f = 2.40 mm, Fno = 2.20, HFOV = 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.593 | ASP | 0.340 | Plastic | 1.544 | 55.9 | 5.33 |
| 2 | | 3.270 | ASP | 0.134 | | | | |
| 3 | Ape. Stop | Plano | | 0.177 | | | | |
| 4 | Lens 2 | −32.164 | ASP | 0.331 | Plastic | 1.544 | 55.9 | 68.59 |
| 5 | | −17.339 | ASP | 0.050 | | | | |
| 6 | Lens 3 | 1.908 | ASP | 0.236 | Plastic | 1.544 | 55.9 | 25.18 |
| 7 | | 2.120 | ASP | 0.204 | | | | |
| 8 | Lens 4 | −2.732 | ASP | 0.826 | Plastic | 1.544 | 55.9 | 2.38 |
| 9 | | −0.972 | ASP | 0.030 | | | | |
| 10 | Lens 5 | 1.514 | ASP | 0.563 | Plastic | 1.650 | 21.4 | −3.57 |
| 11 | | 0.782 | ASP | 0.500 | | | | |
| 12 | IR-cut filter | Plano | | 0.200 | Glass | 1.517 | 64.2 | — |
| 13 | | Plano | | 0.324 | | | | |
| 14 | Image | Plano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k= | −1.8518E+00 | 1.6657E+00 | −7.0000E+01 | −1.0000E+00 | −9.2978E+00 |
| A4= | −1.1491E−02 | −3.4212E−02 | 2.2715E−03 | −1.7789E−01 | −3.8017E−01 |
| A6= | 6.9009E−01 | 1.9009E−02 | −7.6740E−01 | −9.2186E−01 | 2.2958E−01 |
| A8= | −3.4472E+00 | −1.0099E+00 | 1.0166E+00 | 5.8108E+00 | −1.0056E+00 |
| A10= | 8.6285E+00 | 2.2205E+00 | −1.6090E+00 | −1.9353E+01 | 1.8879E+00 |
| A12= | −1.1351E+01 | −4.8591E+00 | 2.9565E+00 | 3.4647E+01 | −1.2728E+00 |
| A14= | 5.5859E+00 | 4.9804E+00 | −8.8194E+00 | −3.1628E+01 | 3.1220E−01 |
| A16= | | | | 1.1506E+01 | −3.7968E−02 |

| Surface # | 7 | 8 | 9 | 10 | 11 |
|---|---|---|---|---|---|
| k= | −1.7610E−01 | −3.0000E+01 | −1.1296E+00 | −3.7484E−01 | −3.3283E+00 |
| A4= | −1.3521E−01 | 1.3762E−01 | 1.5140E−01 | −3.0961E−01 | −1.3591E−01 |
| A6= | −2.7973E−01 | −3.0320E−01 | −4.1634E−01 | 9.1606E−03 | 4.8657E−02 |
| A8= | 4.8745E−01 | 5.3275E−01 | 6.0204E−01 | 2.5548E−02 | −9.5843E−03 |
| A10= | −4.7526E−01 | −4.6642E−01 | −5.9194E−01 | 6.6908E−03 | 4.8556E−04 |
| A12= | 3.4418E−01 | 1.2412E−01 | 4.0023E−01 | −8.5672E−03 | 3.1121E−05 |
| A14= | −2.6183E−01 | 1.8066E−02 | −1.4625E−01 | −2.3554E−03 | 1.3461E−07 |
| A16= | 8.7605E−02 | −7.9881E−03 | 2.0994E−02 | 1.4200E−03 | −2.0730E−10 |

6th Embodiment

Figure 11:
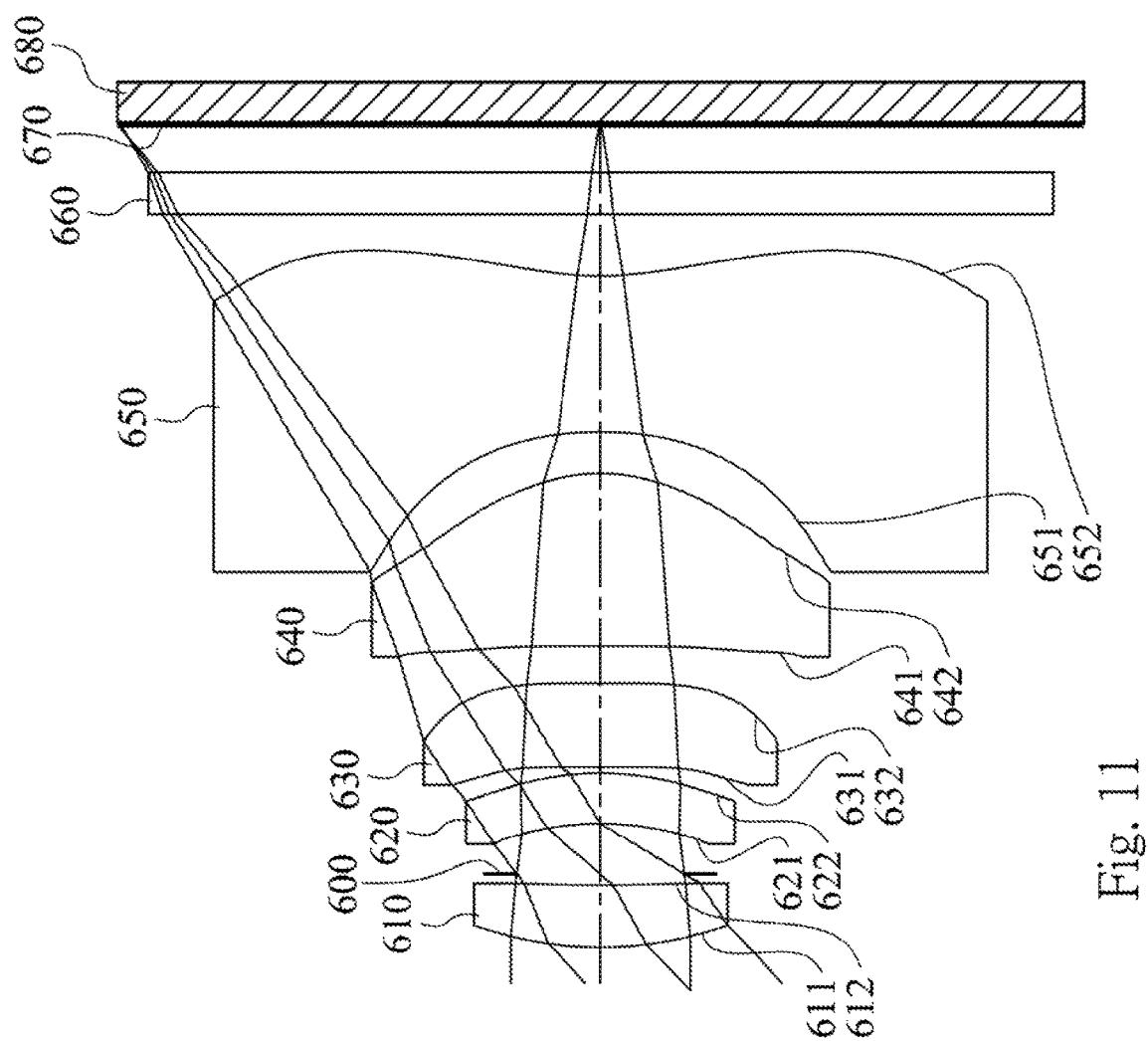
FIG. 11 is a schematic view of an image capturing device according to the 6th embodiment of the present disclosure.
Figure 12:
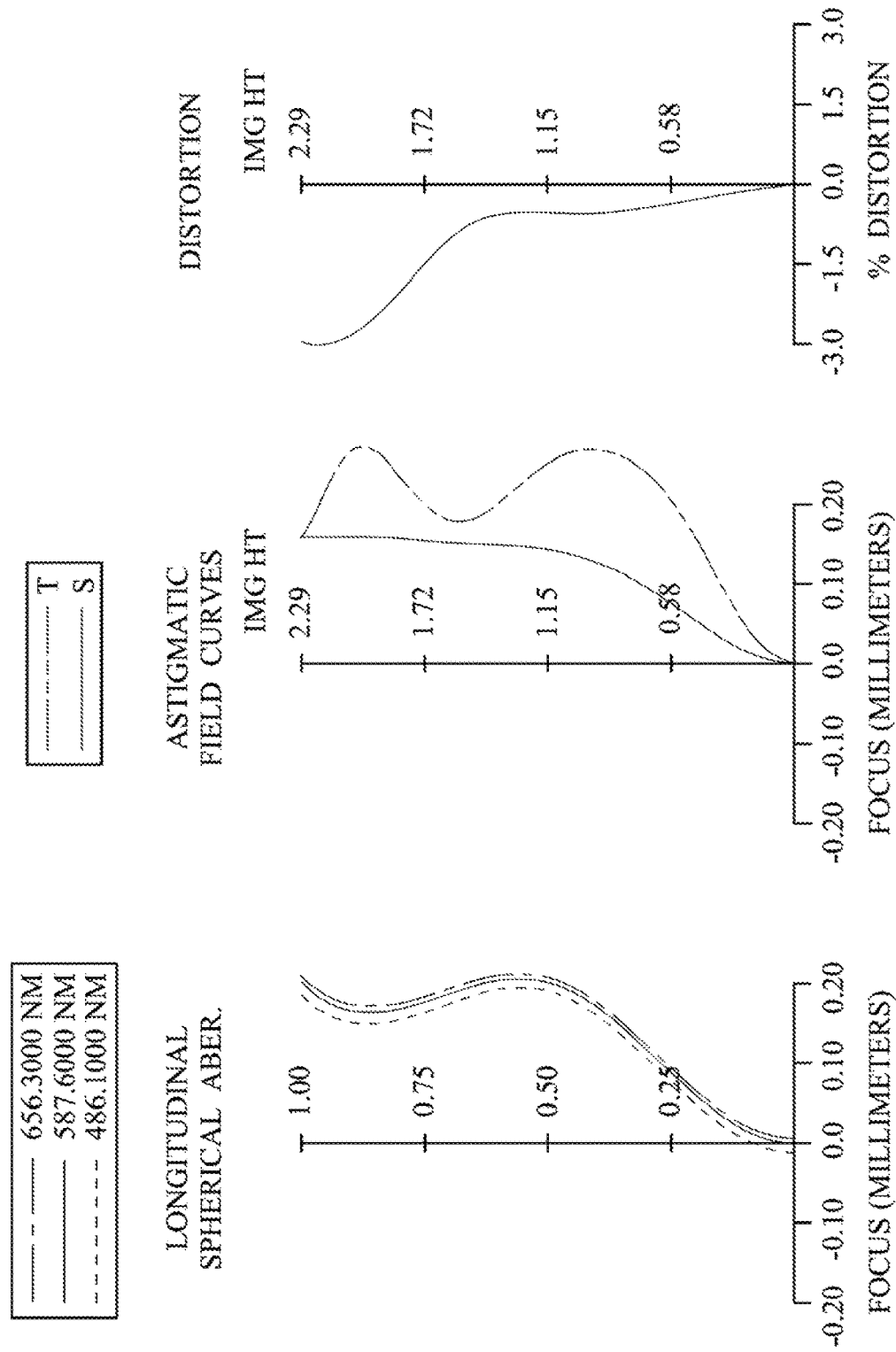
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11 the image capturing device includes the optical photographing lens assembly (not otherwise herein labeled) of the present disclosure and an image sensor 680. The optical photographing lens assembly includes, in order from an object side to an image side, a first lens element 610, an aperture stop 600, a second lens element 620, a third lens element 630, a fourth lens element 640, a fifth lens element 650 an IR-cut filter 660, and an image plane 670, wherein the optical photographing lens assembly has a total of five lens elements (610-650) with refractive power.

The first lens element 610 with positive refractive power has an object-side surface 611 being convex in a paraxial region thereof and an image-side surface 612 being concave in a paraxial region thereof, and is made of plastic material. The object-side surface 611 and the image-side surface 612 of the first lens element 610 are aspheric.

The second lens element 620 with positive refractive power has an object-side surface 621 being concave in a paraxial region thereof and an image-side surface 622 being convex in a paraxial region thereof, and is made of plastic material. The object-side surface 621 and the image-side surface 622 of the second lens element 620 are aspheric.

The third lens element 630 with positive refractive power has an object-side surface 631 being convex in a paraxial region thereof and an image-side surface 632 being concave in a paraxial region thereof, and is made of plastic material. The object-side surface 631 and the image-side surface 632 of the third lens element 630 are aspheric.

The fourth lens element 640 with positive refractive power has an object-side surface 641 being convex in a paraxial region thereof and an image-side surface 642 being convex in a paraxial region thereof, and is made of plastic material. The object-side surface 641 and the image-side surface 642 of the fourth lens element 640 are aspheric.

The fifth lens element 650 with negative refractive power has an object-side surface 651 being concave in a paraxial region thereof and an image-side surface 652 being concave in a paraxial region thereof, and is made of plastic material. The object-side surface 651 and the image-side surface 652 of the fifth lens element 650 are aspheric. Furthermore, both of the object-side surface 651 and the image-side surface 652 of the fifth lens element 650 have at least one inflection point.

The IR-cut filter 660 and a cover glass 670 are made of glass and located in order between the fifth lens element 650 and the image plane 670, and will not affect the focal length of the optical photographing lens assembly. The image sensor 680 is disposed on the image plane 670 of the optical photographing lens assembly.

The detailed optical data of the 6th embodiment are shown in Table 11 and the aspheric surface data are shown in Table 12 below.

TABLE 11

Embodiment 6
f = 2.40 mm, Fno = 2.80, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.773 | ASP | 0.297 | Plastic | 1.565 | 56.0 | 3.67 |
| 2 | | 11.429 | ASP | 0.053 | | | | |
| 3 | Ape. Stop | Plano | | 0.242 | | | | |
| 4 | Lens 2 | -1.387 | ASP | 0.238 | Plastic | 1.632 | 23.4 | 30.69 |
| 5 | | -1.381 | ASP | 0.030 | | | | |
| 6 | Lens 3 | 12.612 | ASP | 0.401 | Plastic | 1.544 | 55.9 | 38.57 |
| 7 | | 31.250 | ASP | 0.174 | | | | |
| 8 | Lens 4 | 691.563 | ASP | 0.829 | Plastic | 1.544 | 55.9 | 1.53 |
| 9 | | -0.833 | ASP | 0.198 | | | | |
| 10 | Lens 5 | -1.651 | ASP | 0.739 | Plastic | 1.639 | 23.5 | -1.09 |
| 11 | | 1.408 | ASP | 0.300 | | | | |
| 12 | IR-cut filter | Plano | | 0.200 | Glass | 1.517 | 64.2 | — |
| 13 | | Plano | | 0.229 | | | | |
| 14 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k= | -7.0395E+00 | 5.0000E+00 | -5.7073E+00 | -3.0000E+01 | 5.0000E+00 |
| A4= | 2.6393E-02 | 6.4722E-02 | -1.4229E-01 | -7.5520E-01 | -6.2541E-01 |
| A6= | 2.2736E+00 | -2.2209E-01 | 8.4691E-02 | -1.2619E+00 | 3.8495E-01 |
| A8= | -1.7072E+01 | -1.6257E+00 | 4.2814E+00 | 2.8542E+01 | -4.2133E+00 |
| A10= | 6.3454E+01 | 1.0709E+01 | -3.1714E+00 | -1.4474E+02 | 1.6142E+01 |
| A12= | -1.1849E+02 | -3.2479E+01 | 4.8637E+01 | 3.8855E+02 | -1.5649E+01 |
| A14= | 8.5669E+01 | 2.8334E+01 | -3.4926E+01 | -5.3042E+02 | 8.3753E-01 |
| A16= | | | | 2.7809E+02 | -9.6747E-02 |

TABLE 12-continued

Aspheric Coefficients

| Surface # | 7 | 8 | 9 | 10 | 11 |
|---|---|---|---|---|---|
| k= | −3.0000E+01 | 5.0000E+00 | −1.0251E+00 | −3.0235E−02 | −1.6755E+01 |
| A4= | −5.3824E−01 | −1.0390E−01 | 3.6029E−01 | −1.7606E−01 | −9.0545E−02 |
| A6= | −2.7892E−01 | −6.2254E−01 | −1.2234E+00 | 2.3102E−02 | 5.6023E−02 |
| A8= | 1.6820E+00 | 2.5266E+00 | 2.8608E+00 | 3.3255E−03 | −2.6063E−02 |
| A10= | −3.7214E+00 | −3.2627E+00 | −4.2689E+00 | −7.1140E−04 | 4.6804E−03 |
| A12= | 4.5899E+00 | 1.4645E+00 | 4.3523E+00 | −5.4507E−02 | 3.0933E−05 |
| A14= | −3.9622E+00 | 3.5395E−01 | −2.5572E+00 | −2.6205E−03 | −9.5980E−05 |
| A16= | 1.5232E+00 | −4.3752E−01 | 6.1361E−01 | 2.9843E−02 | 8.8712E−06 |

In the optical photographing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f [mm] | 2.40 | f2/f3 | 0.80 |
| Fno | 2.80 | (|f/f1| + |f/f2| + |f/f3|)/(|f/f4| + |f/f5|) | 0.21 |
| HFOV [deg.] | 43.1 | R10/Yc52 | 1.27 |
| V5/V4 | 0.42 | SD/TD | 0.89 |
| (T23 + T45)/T34 | 1.31 | 1/tan(HFOV) | 1.07 |
| f/R6 | 0.08 | TL/ImgH | 1.71 |

7th Embodiment

Figure 13:
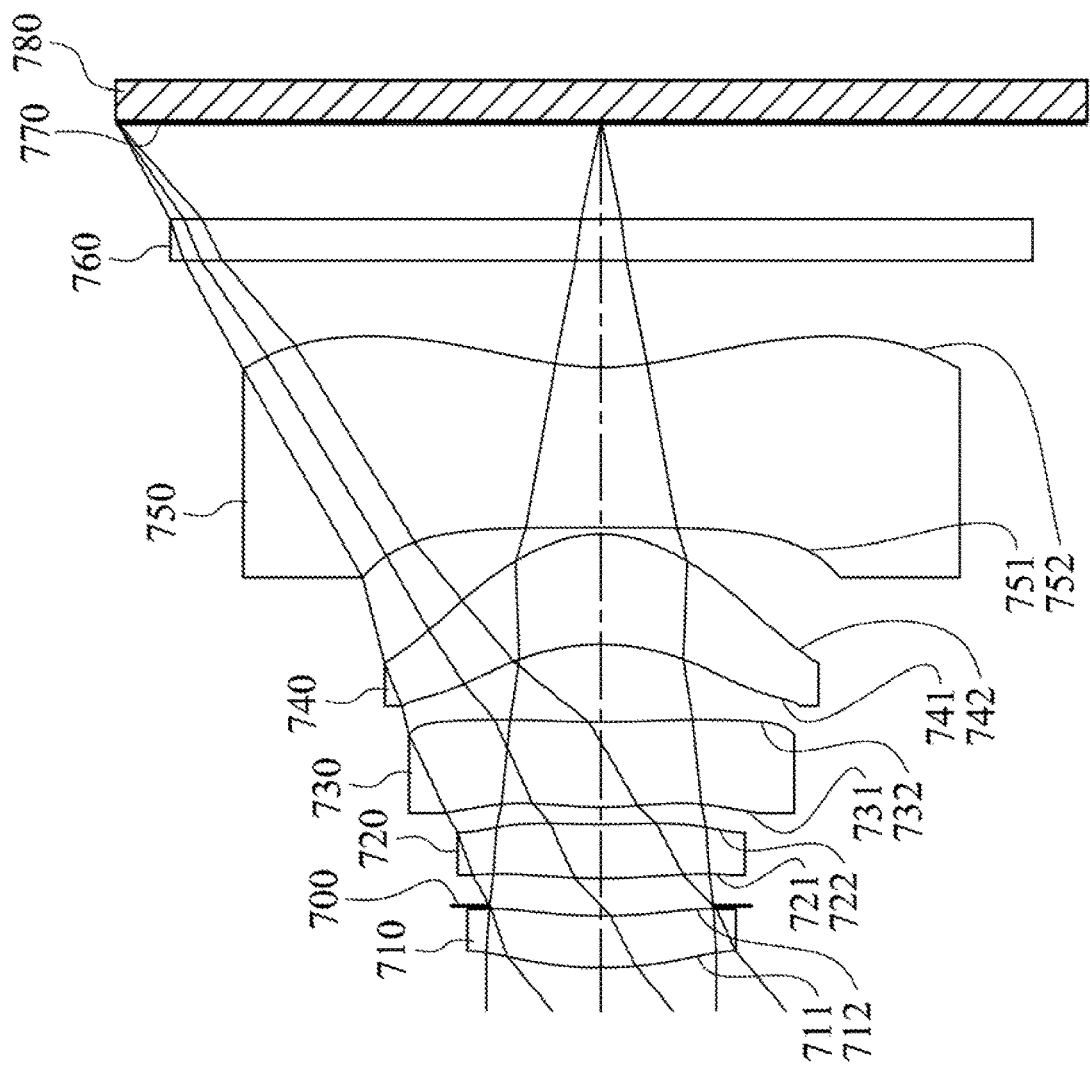
FIG. 13 is a schematic view of an image capturing device according to the 7th embodiment of the present disclosure.
Figure 14:
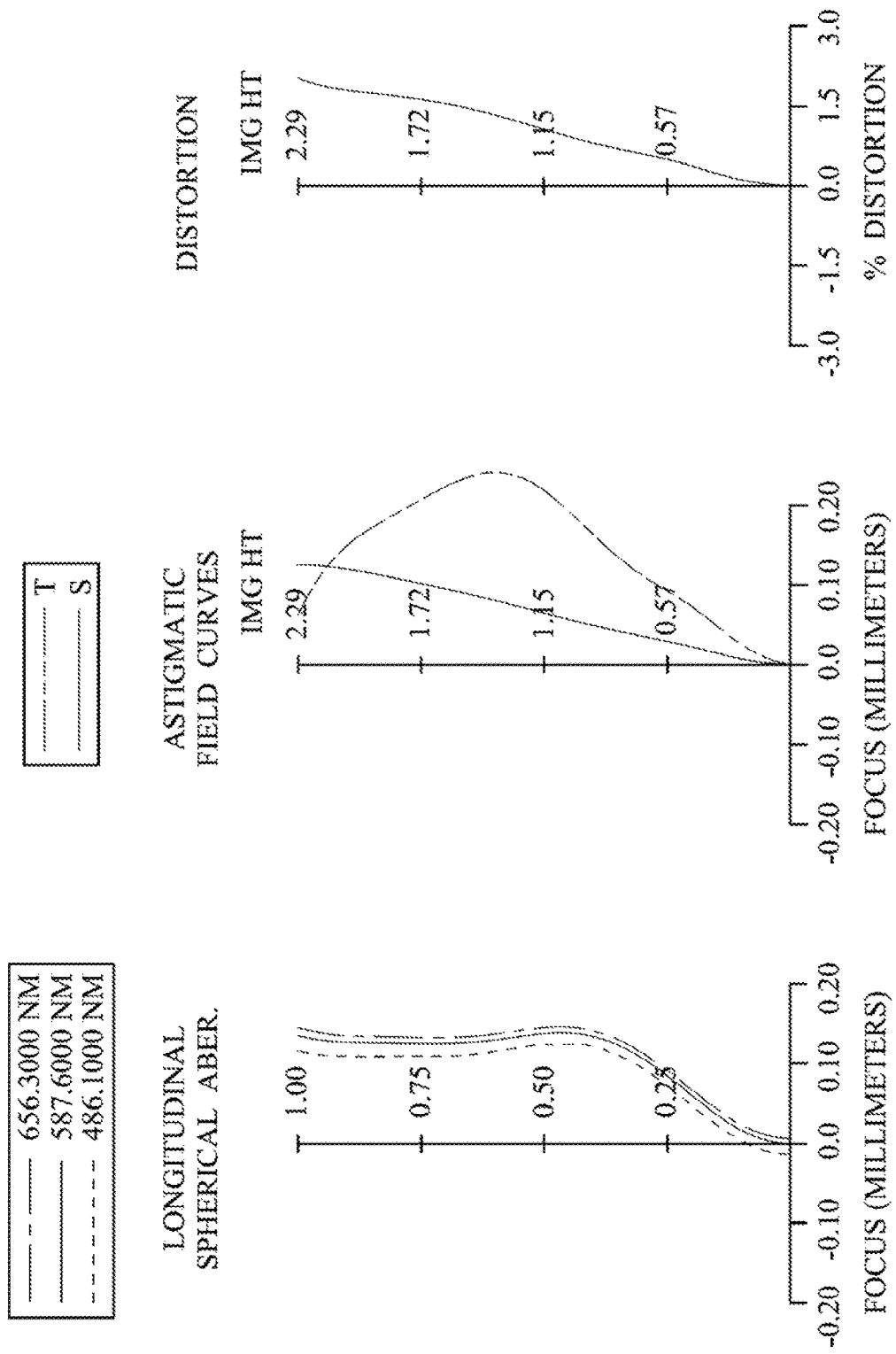
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows in order from left to right, spherical aberration curves, astigmatic field curves and a distortion curve of the image capturing device according to the 7th embodiment.

In FIG. 13, the image capturing device includes the optical photographing lens assembly (not otherwise herein labeled) of the present disclosure and an image sensor 780. The optical photographing lens assembly includes, in order from an object side to an image side, a first lens element 710, an aperture stop 700, a second lens element 720 a third lens element 730, a fourth lens element 740, a fifth lens element 750, an IR-cut filter 760 and an image plane 770, wherein the optical photographing lens assembly has a total of five lens elements (710-750) with refractive power.

The first lens element 710 with positive refractive power has an object-side surface 711 being convex in a paraxial region thereof and an image-side surface 712 being concave in a paraxial region thereof, and is made of glass material. The object-side surface 711 and the image-side surface 712 of the first lens element 710 are aspheric.

The second lens element 720 with positive refractive power has an object-side surface 721 being convex in a paraxial region thereof and an image-side surface 722 being concave in a paraxial region thereof, and is made of plastic material. The object-side surface 721 and the image-side surface 722 of the second lens element 720 are aspheric.

The third lens element 730 with positive refractive power has an object-side surface 731 being convex in a paraxial region thereof and an image-side surface 732 being concave in a paraxial region thereof, and is made of plastic material. The object-side surface 731 and the image-side surface 732 of the third lens element 730 are aspheric.

The fourth lens element 740 with positive refractive power has an object-side surface 741 being concave in a paraxial region thereof and an image-side surface 742 being convex in a paraxial region thereof, and is made of plastic material. The object-side surface 741 and the image-side surface 742 of the fourth lens element 740 are aspheric.

The fifth lens element 750 with negative refractive power has an object-side surface 751 being convex in a paraxial region thereof and an image-side surface 752 being concave in a paraxial region thereof, and is made of plastic material. The object-side surface 751 and the image-side surface 752 of the fifth lens element 750 are aspheric. Furthermore, both of the object-side surface 751 and the image-side surface 752 of the fifth lens element 750 have at least one inflection point.

The IR-cut filter 760 and a cover glass 770 are made of glass and located in order between the fifth lens element 750 and the image plane 770, and will not affect the focal length of the optical photographing lens assembly. The image sensor 780 is disposed on the image plane 770 of the optical photographing lens assembly.

The detailed optical data of the 7th embodiment are shown in Table 13 and the aspheric surface data are shown in Table 14 below.

TABLE 13

Embodiment 7
f = 2.61 mm, Fno = 2.40, HFOV = 39.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.707 | ASP | 0.248 | Glass | 1.571 | 50.9 | 9.57 |
| 2 | | 2.352 | ASP | 0.048 | | | | |
| 3 | Ape. Stop | Plano | | 0.130 | | | | |
| 4 | Lens 2 | 3.273 | ASP | 0.255 | Plastic | 1.565 | 56.0 | 34.33 |
| 5 | | 3.827 | ASP | 0.080 | | | | |

TABLE 13-continued

Embodiment 7
f = 2.61 mm, Fno = 2.40, HFOV = 39.7 deg.

| Surface # | | Curvature Radius | Thickness | Material | Index | Abbe # | Focal Length |
|---|---|---|---|---|---|---|---|
| 6 | Lens 3 | 1.786 ASP | 0.403 | Plastic | 1.544 | 55.9 | 4.59 |
| 7 | | 5.769 ASP | 0.366 | | | | |
| 8 | Lens 4 | −1.066 ASP | 0.521 | Plastic | 1.565 | 56.0 | 1.89 |
| 9 | | −0.628 ASP | 0.030 | | | | |
| 10 | Lens 5 | 248.402 ASP | 0.763 | Plastic | 1.639 | 23.5 | −1.94 |
| 11 | | 1.235 ASP | 0.500 | | | | |
| 12 | IR-cut filter | Plano | 0.200 | Glass | 1.517 | 64.2 | — |
| 13 | | Plano | 0.459 | | | | |
| 14 | Image | Plano | — | | | | |

Note:
Reference wavelength is 587.6 nm (d-line).

TABLE 14

Aspheric Coefficients

| Surface # | 1 | 2 | 4 | 5 | 6 |
|---|---|---|---|---|---|
| k= | −7.3248E+00 | 1.5764E+00 | −2.1795E+01 | −3.0000E+01 | −2.6918E+01 |
| A4= | −7.7878E−02 | −2.0250E−01 | −2.0476E−01 | −9.1685E−01 | −7.4859E−01 |
| A6= | 2.0718E+00 | −2.1325E−01 | −4.6244E−01 | −1.6150E+00 | 6.5438E−01 |
| A8= | −1.7348E+01 | −3.3288E+00 | 4.4066E+00 | 2.7604E+01 | −3.7648E+00 |
| A10= | 6.3632E+01 | 1.4222E+01 | −2.2730E+01 | −1.4099E+02 | 1.5110E+01 |
| A12= | −1.1853E+02 | −3.2498E+01 | 4.8561E+01 | 3.8856E+02 | −1.5643E+01 |
| A14= | 8.5537E+01 | 2.8334E+01 | −3.4926E+01 | −5.3039E+02 | 8.3934E−01 |
| A16= | | | | 2.7821E+02 | −9.7461E−02 |

| Surface # | 7 | 8 | 9 | 10 | 11 |
|---|---|---|---|---|---|
| k= | 5.0000E+00 | −1.1847E+00 | −1.1714E+00 | 5.0000E+00 | −1.2256E+01 |
| A4= | −1.5093E−01 | 6.5398E−03 | 3.1766E−01 | −1.0289E−01 | −8.6580E−02 |
| A6= | −4.7322E−01 | −4.8656E−01 | −1.2589E+00 | 1.0767E−01 | 3.4720E−02 |
| A8= | 1.8728E+00 | 2.5540E+00 | 2.9398E+00 | −4.1496E−02 | −1.4390E−02 |
| A10= | −3.4282E+00 | −3.2300E+00 | −4.2477E+00 | 3.3395E−02 | 3.2901E−03 |
| A12= | 4.6492E+00 | 1.4231E+00 | 4.3324E+00 | −2.1540E−02 | −2.3604E−04 |
| A14= | −3.9994E+00 | 2.8687E−01 | −2.5704E+00 | −5.2949E−04 | −8.3973E−05 |
| A16= | 1.1896E+00 | −4.6771E−01 | 6.1751E−01 | 1.8227E−04 | 1.7216E−05 |

In the optical photographing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f [mm] | 2.61 | f2/f3 | 7.48 |
| Fno | 2.40 | (|f/f1| + |f/f2| + |f/f3|)/(|f/f4| + |f/f5|) | 0.34 |
| HFOV [deg.] | 39.7 | R10/Yc52 | 1 |
| V5/V4 | 0.42 | SD/TD | 0.90 |
| (T23 + T45)/T34 | 0.30 | 1/tan(HFOV) | 1.20 |
| f/R6 | 0.45 | TL/ImgH | 1.74 |

8th Embodiment

Figure 15:
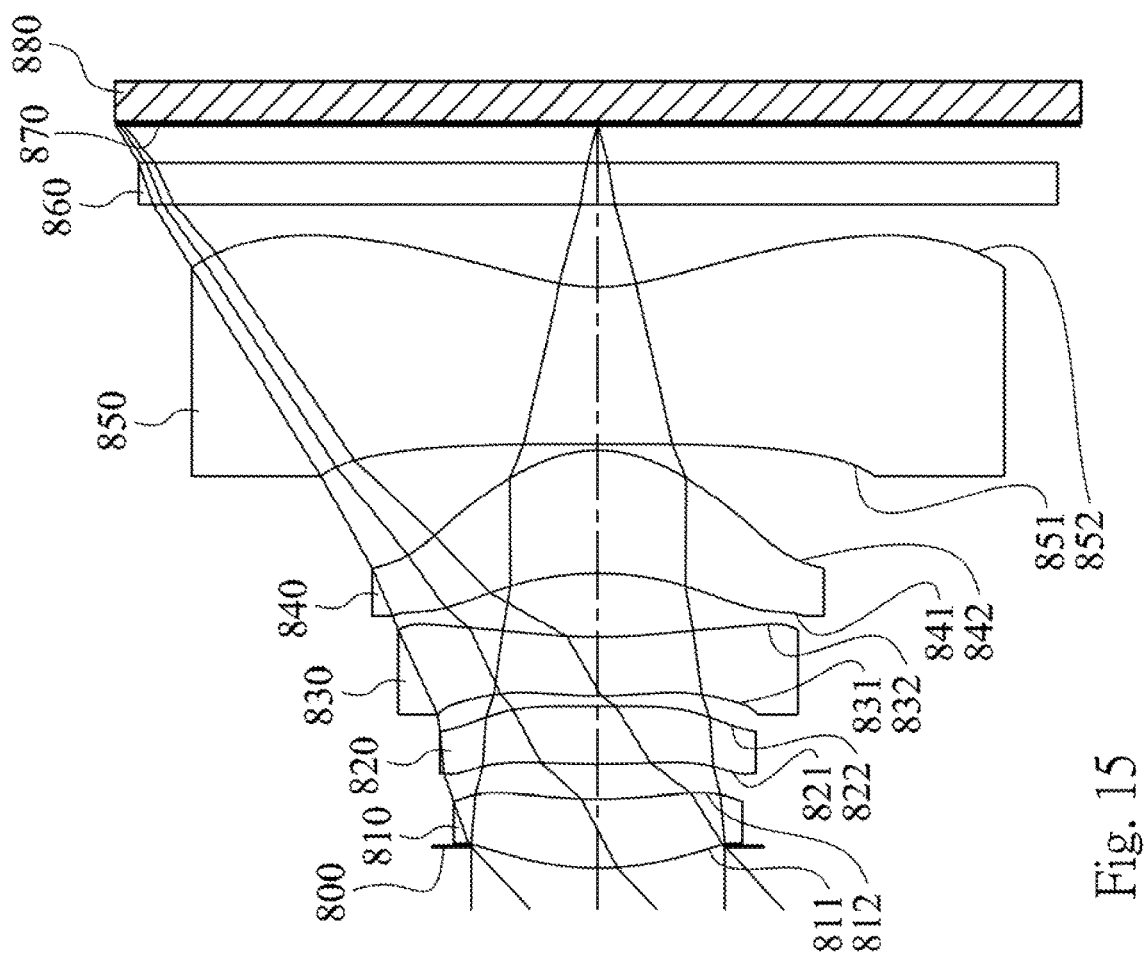
FIG. 15 is a schematic view of an image capturing device according to the 8th embodiment of the present disclosure.
Figure 16:
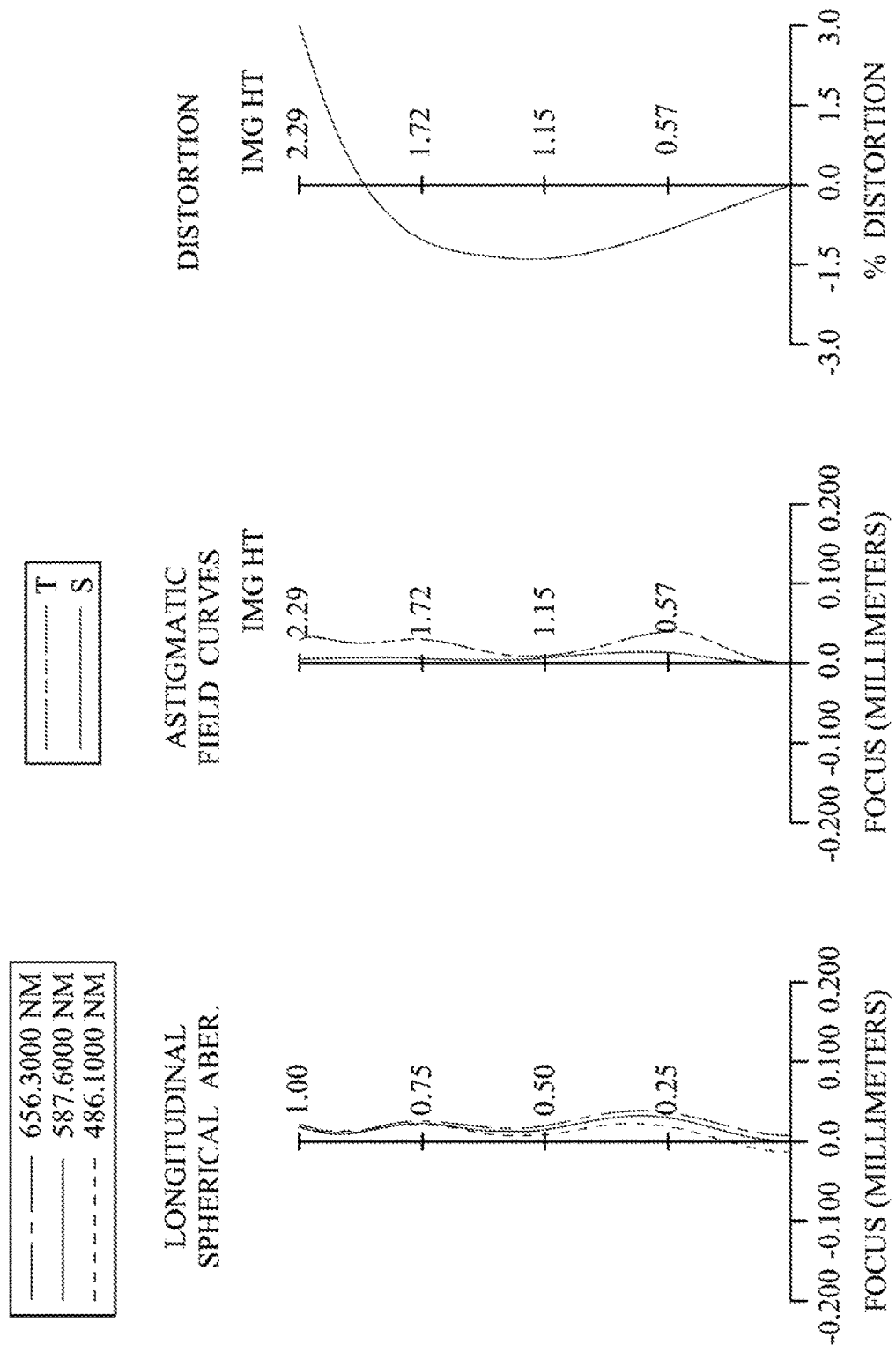
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment.

In FIG. 15, the image capturing device includes the optical photographing lens assembly (not otherwise herein labeled) of the, present disclosure and an image sensor 880. The optical photographing lens assembly includes, in order from an object side to an image side, an aperture stop 800, a first lens element 810, a second lens element 820, a third lens element 830, a fourth lens element 840, a fifth lens element 850, an IR-cut filter 860 and an image plane 870, wherein the optical photographing lens assembly has a total of five lens elements (810-850) with refractive power.

The first lens element 810 with positive refractive power has an object-side surface 811 being convex in a paraxial region thereof and an image-side surface 812 being concave in a paraxial region thereof, and is made of plastic material. The object-side surface 811 and the image-side surface 812 of the first lens element 810 are aspheric.

The second lens element 820 with positive refractive power has an object-side surface 821 being convex in a paraxial region thereof and an image-side surface 822 being concave in a paraxial region thereof, and is made of plastic material. The object-side surface 821 and the image-side surface 822 of the second lens element 820 are aspheric.

The third lens element 830 with positive refractive power has an object-side surface 831 being convex in a paraxial region thereof and an image-side surface 832 being concave in a paraxial region thereof, and is made of plastic material. The object-side surface 831 and the image-side surface 832 of the third lens element 830 are aspheric.

The fourth lens element 840 with positive refractive power has an object-side surface 841 being concave in a paraxial region thereof and an image-side surface 842 being convex in a paraxial region thereof, and is made of plastic material. The object-side surface 841 and the image-side surface 842 of the fourth lens element 840 are aspheric.

The fifth lens element 850 with negative refractive power has an object-side surface 851 being concave in a paraxial region thereof and an image-side surface 852 being concave in a paraxial region thereof, and is made of plastic material.

The object-side surface 851 and the image-side surface 852 of the fifth lens element 850 are aspheric. Furthermore, the image-side surface 852 of the fifth lens element 850 has at least one inflection point.

The IR-cut filter 860 is made of glass and located between the fifth lens element 850 and the image plane 870, and will not affect the focal length of the optical photographing lens assembly. The image sensor 880 is disposed on the image plane 870 of the optical photographing lens assembly.

The detailed optical data of the 8th embodiment are shown in Table 15 and the aspheric surface data are shown in Table 16 below.

TABLE 15

Embodiment 8
f = 2.37 mm, Fno = 1.95, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.103 | | | | |
| 2 | Lens 1 | 1.423 | ASP | 0.330 | Plastic | 1.565 | 56.0 | 5.14 |
| 3 | | 2.559 | ASP | 0.168 | | | | |
| 4 | Lens 2 | 5.652 | ASP | 0.278 | Plastic | 1.565 | 56.0 | 21.17 |
| 5 | | 10.523 | ASP | 0.050 | | | | |
| 6 | Lens 3 | 1.936 | ASP | 0.279 | Plastic | 1.614 | 25.6 | 10.65 |
| 7 | | 2.599 | ASP | 0.307 | | | | |
| 8 | Lens 4 | −1.487 | ASP | 0.592 | Plastic | 1.565 | 56.0 | 1.49 |
| 9 | | −0.616 | ASP | 0.030 | | | | |
| 10 | Lens 5 | −163.399 | ASP | 0.748 | Plastic | 1.650 | 21.4 | −1.38 |
| 11 | | 0.903 | ASP | 0.400 | | | | |
| 12 | IR-cut filter | Plano | | 0.200 | Glass | 1.517 | 64.2 | — |
| 13 | | Plano | | 0.188 | | | | |
| 14 | Image | Plano | | — | | | | |

Note:
Reference wavelength is 587.6 nm (d-line).

TABLE 16

Aspheric Coefficients

| Surface # | 2 | 3 | 4 | 5 | 6 |
|---|---|---|---|---|---|
| k= | −3.9011E+00 | −2.9269E+00 | −1.9870E+01 | −1.5305E+01 | −1.5930E+01 |
| A4= | −3.6637E−02 | −2.0013E−01 | −1.3726E−01 | −8.8078E−01 | −8.7061E−01 |
| A6= | 2.1301E+00 | 2.9652E−01 | −1.1549E+00 | −2.1787E+00 | 6.5169E−01 |
| A8= | −1.7093E+01 | −5.6354E+00 | 2.9910E+00 | 2.7158E+01 | −3.4503E+00 |
| A10= | 6.3175E+01 | 1.7234E+01 | −1.8676E+01 | −1.3930E+02 | 1.4411E+01 |
| A12= | −1.1853E+02 | −3.2498E+01 | 4.8561E+01 | 3.8856E+02 | −1.5646E+01 |
| A14= | 8.5534E+01 | 2.8334E+01 | −3.4926E+01 | −5.3039E+02 | 8.3941E−01 |
| A16= | | | | 2.7821E+02 | −9.7457E−02 |

| Surface # | 7 | 8 | 9 | 10 | 11 |
|---|---|---|---|---|---|
| k= | −3.4028E+00 | −6.8262E−01 | −1.5409E+00 | −3.0000E+01 | −8.8324E+00 |
| A4= | −1.5970E−01 | −2.9907E−02 | 2.6280E−01 | −7.4508E−02 | −7.6782E−02 |
| A6= | −4.2234E−01 | −5.0342E−01 | −1.3271E+00 | 8.7891E−02 | 4.3868E−02 |
| A8= | 1.8005E+00 | 2.5776E+00 | 2.9658E+00 | −8.3920E−02 | −1.9699E−02 |
| A10= | −3.4284E+00 | −3.2288E+00 | −4.1970E+00 | 3.7690E−02 | 4.3836E−03 |
| A12= | 4.6604E+00 | 1.4334E+00 | 4.3562E+00 | −8.5672E−03 | −2.5394E−04 |
| A14= | −3.8601E+00 | 3.3824E−01 | −2.5739E+00 | 2.1586E−03 | −7.3896E−05 |
| A16= | 1.2240E+00 | −4.5562E−01 | 6.0211E−01 | −9.3032E−04 | 1.0254E−05 |

In the optical photographing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f [mm] | 2.37 | f2/f3 | 1.99 |
| Fno | 1.95 | (|f/f1| + |f/f2| + |f/f3|)/ (|f/f4| + |f/f5|) | 0.24 |
| HFOV [deg.] | 43.1 | R10/Yc52 | 0.66 |
| V5/V4 | 0.38 | SD/TD | 0.96 |
| (T23 + T45)/T34 | 0.26 | 1/tan(HFOV) | 1.07 |
| f/R6 | 0.91 | TL/ImgH | 1.56 |

9th Embodiment

Figure 17:
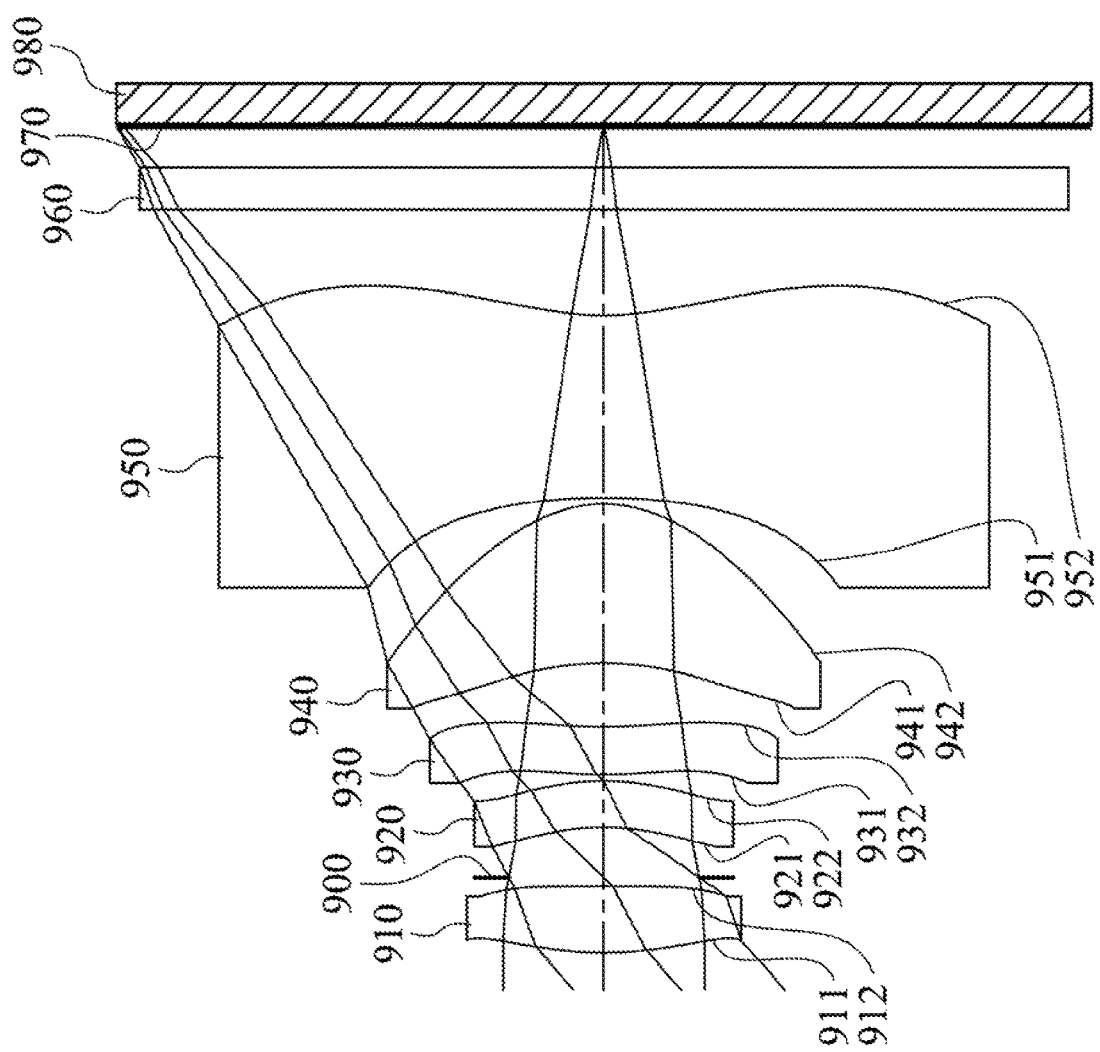
FIG. 17 is a schematic view of an image capturing device according to the 9th embodiment of the present disclosure.
Figure 18:
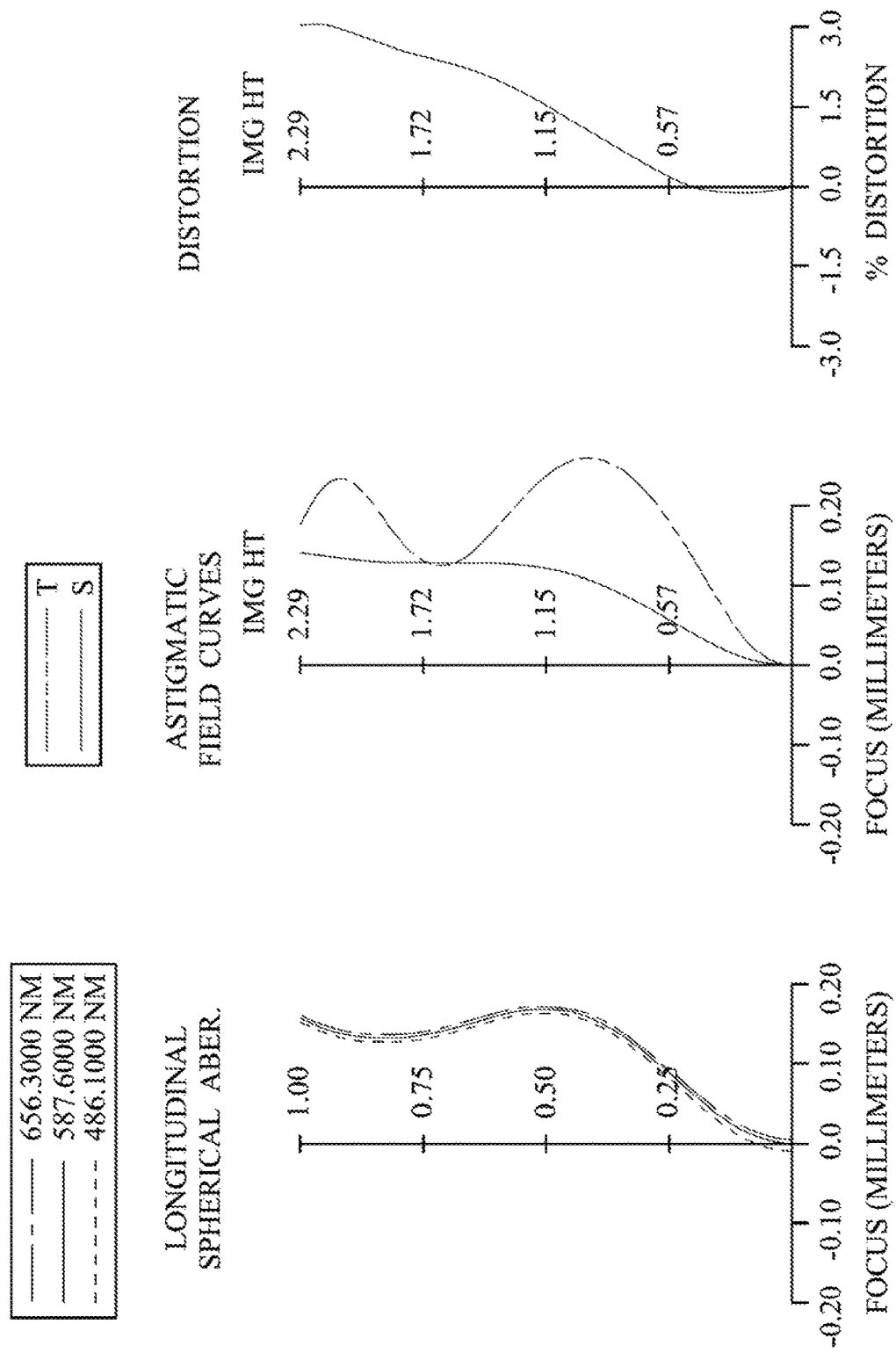
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment.

In FIG. 17, the image capturing device includes the optical photographing lens assembly (not otherwise herein labeled) of the present disclosure and an image sensor 980. The optical photographing lens assembly includes, in order from an object side to an image side, a first lens element 910, an aperture stop 900, a second lens element 920, a third lens element 930, a fourth lens element 940, a fifth lens element 950, an IR-cut 960 and an image plane 970, wherein the optical photographing lens assembly has a total of five lens elements (910-950) with refractive power.

The first lens element 910 with positive refractive power has an object-side surface 911 being convex in a paraxial region thereof and an image-side surface 912 being convex in a paraxial region thereof, and is made of plastic material. The object-side surface 911 and the image-side surface 912 of the first lens element 910 are aspheric.

The second lens element 920 with positive refractive power has an object-side surface 921 being concave in a paraxial region thereof and an image-side surface 922 being convex in a paraxial region thereof, and is made of plastic material. The object-side surface 921 and the image-side surface 922 of the second lens element 920 are aspheric.

The third lens element 930 with positive refractive power has an object-side surface 931 being convex in a paraxial region thereof and an image-side surface 932 being concave in a paraxial region thereof, and is made of plastic material. The object-side surface 931 and the image-side surface 932 of the third lens element 930 are aspheric.

The fourth lens element 940 with positive refractive power has an object-side surface 941 being concave in a paraxial region thereof and an image-side surface 942 being convex in a paraxial region thereof, and is made of plastic material. The object-side surface 941 and the image-side surface 942 of the fourth lens element 940 are aspheric.

The fifth lens element 950 with negative refractive power has an object-side surface 951 being concave in a paraxial region thereof and an image-side surface 952 being concave in a paraxial region thereof, and is made of plastic material. The object-side surface 951 and the image-side surface 952 of the fifth lens element 950 are aspheric. Furthermore, the image-side surface 952 of the fifth lens element 950 has at least one inflection point.

The IR-cut filter 960 is made of glass and located between the fifth lens element 950 and the image plane 970, and will not affect the focal length of the optical photographing lens assembly. The image sensor 980 is disposed on the image plane 970 of the optical photographing lens assembly.

The detailed optical data of the 9th embodiment are shown in Table 17 and the aspheric surface data are shown in Table 18 below.

TABLE 17

Embodiment 9
f = 2.47 mm, Fno = 2.60, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.746 | ASP | 0.314 | Plastic | 1.565 | 56.0 | 2.94 |
| 2 | | −32.873 | ASP | 0.041 | | | | |
| 3 | Ape. Stop | Plano | | 0.239 | | | | |
| 4 | Lens 2 | −1.114 | ASP | 0.216 | Plastic | 1.632 | 23.4 | 24.80 |
| 5 | | −1.118 | ASP | 0.030 | | | | |
| 6 | Lens 3 | 2.173 | ASP | 0.227 | Plastic | 1.544 | 55.9 | 44.10 |
| 7 | | 2.302 | ASP | 0.297 | | | | |
| 8 | Lens 4 | −1.481 | ASP | 0.755 | Plastic | 1.544 | 55.9 | 1.40 |
| 9 | | −0.593 | ASP | 0.030 | | | | |
| 10 | Lens 5 | −2.776 | ASP | 0.860 | Plastic | 1.639 | 23.5 | −1.25 |
| 11 | | 1.257 | ASP | 0.500 | | | | |
| 12 | IR-cut filter | Plano | | 0.200 | Glass | 1.517 | 64.2 | — |
| 13 | | Plano | | 0.195 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k= | −9.6673E+00 | −3.0000E+01 | −8.7651E+00 | −1.8235E+01 | −2.0475E+00 |
| A4= | −4.6230E−02 | −2.2004E−01 | −1.3563E−01 | −5.0108E−01 | −7.7584E−01 |
| A6= | 1.8951E+00 | −1.3526E−01 | 4.5564E−02 | −1.1854E+00 | 4.9537E−01 |
| A8= | −1.7413E+01 | −3.8538E+00 | 4.8136E+00 | 2.8617E+01 | −4.1241E+00 |
| A10= | 6.3200E+01 | 1.6202E+01 | −2.1860E+01 | −1.4409E+02 | 1.4735E+01 |
| A12= | −1.1849E+02 | −3.2479E+01 | 4.8637E+01 | 3.8855E+02 | −1.5648E+01 |
| A14= | 8.5669E+01 | 2.8334+01 | −3.4926E+01 | −5.3042E+02 | 8.3530E−01 |
| A16= |  |  |  | 2.7809E+02 | −9.6747E−02 |

| Surface # | 7 | 8 | 9 | 10 | 11 |
|---|---|---|---|---|---|
| k= | −3.0000E+01 | −2.3509E+00 | −1.3148E+00 | −7.4712E+00 | −1.5185E+01 |
| A4= | −3.1046E−01 | 6.3250E−03 | 3.2559E−01 | −1.1599E−01 | −8.5707E−02 |
| A6= | −4.3459E−01 | −5.1889E−01 | −1.3329E+00 | 5.9070E−03 | 4.4611E−02 |
| A8= | 1.9220E+00 | 2.4940E+00 | 2.8456E+00 | −3.5729E−02 | −2.1132E−02 |
| A10= | −3.3786E+00 | −3.3276E+00 | −4.2800E+00 | 1.9846E−02 | 4.8347E−03 |
| A12= | 4.6456E+00 | 1.4347E+00 | 4.3435E+00 | −3.2553E−02 | −1.5714E−04 |
| A14= | −4.3625E+00 | 3.3606E−01 | −2.5520E+00 | 5.5612E−04 | −1.1675E−04 |
| A16= | 8.6798E−01 | −4.7101E−01 | 6.3668E−01 | 1.1843E−02 | 1.3716E−05 |

In the optical photographing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| 9th Embodiment | | | |
|---|---|---|---|
| f [mm] | 2.47 | f2/f3 | 0.56 |
| Fno | 2.60 | (|f/f1| + |f/f2| + |f/f3|)/(|f/f4| + |f/f5|) | 0.27 |
| HFOV [deg.] | 40.7 | R10/Yc52 | 1.14 |
| V5/V4 | 0.42 | SD/TD | 0.88 |
| (T23 + T45)/T34 | 0.20 | 1/tan(HFOV) | 1.16 |
| f/R6 | 1.07 | TL/ImgH | 1.70 |

10th Embodiment

Figure 19:
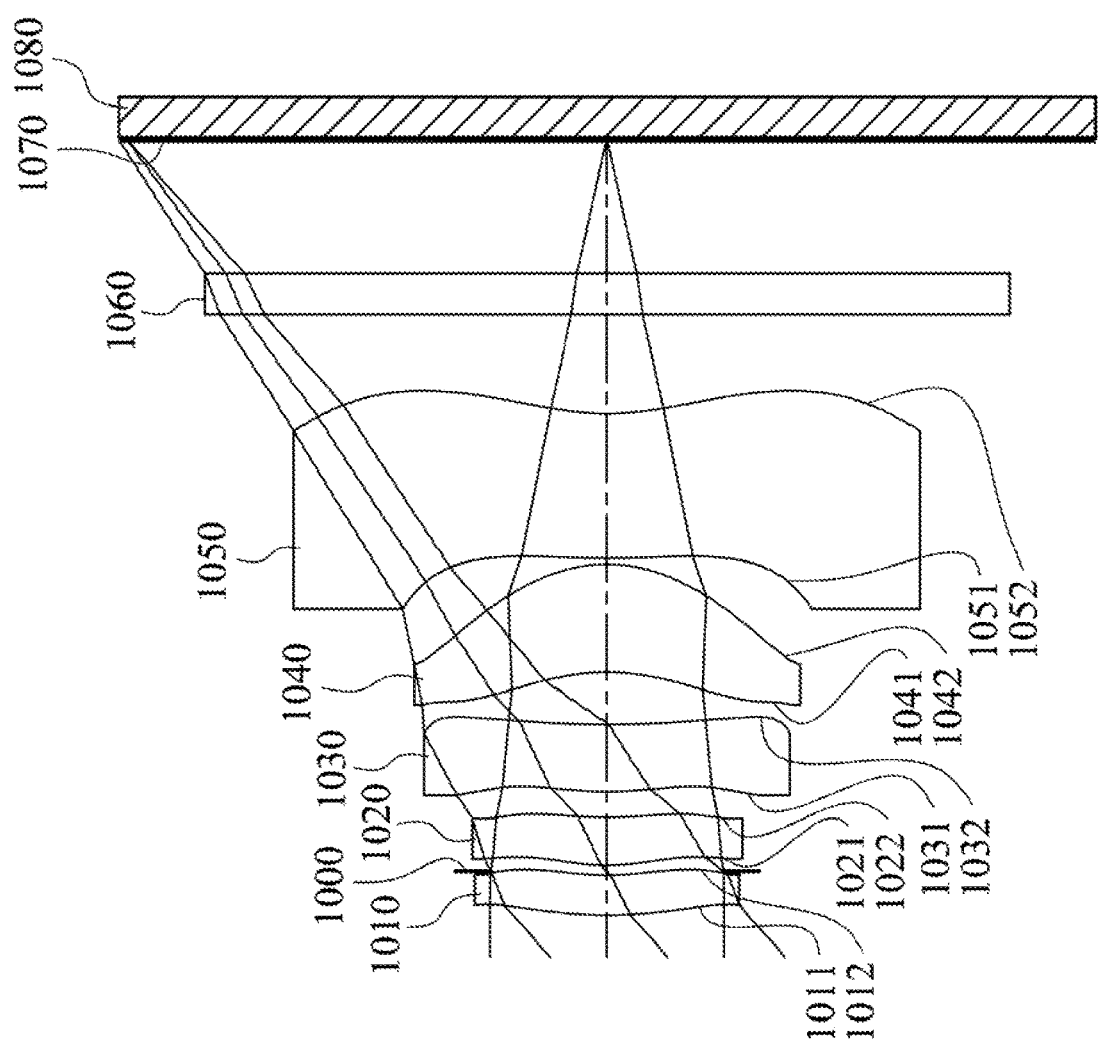
FIG. 19 is a schematic view of an image capturing device according to the 10th embodiment of the present disclosure.
Figure 20:
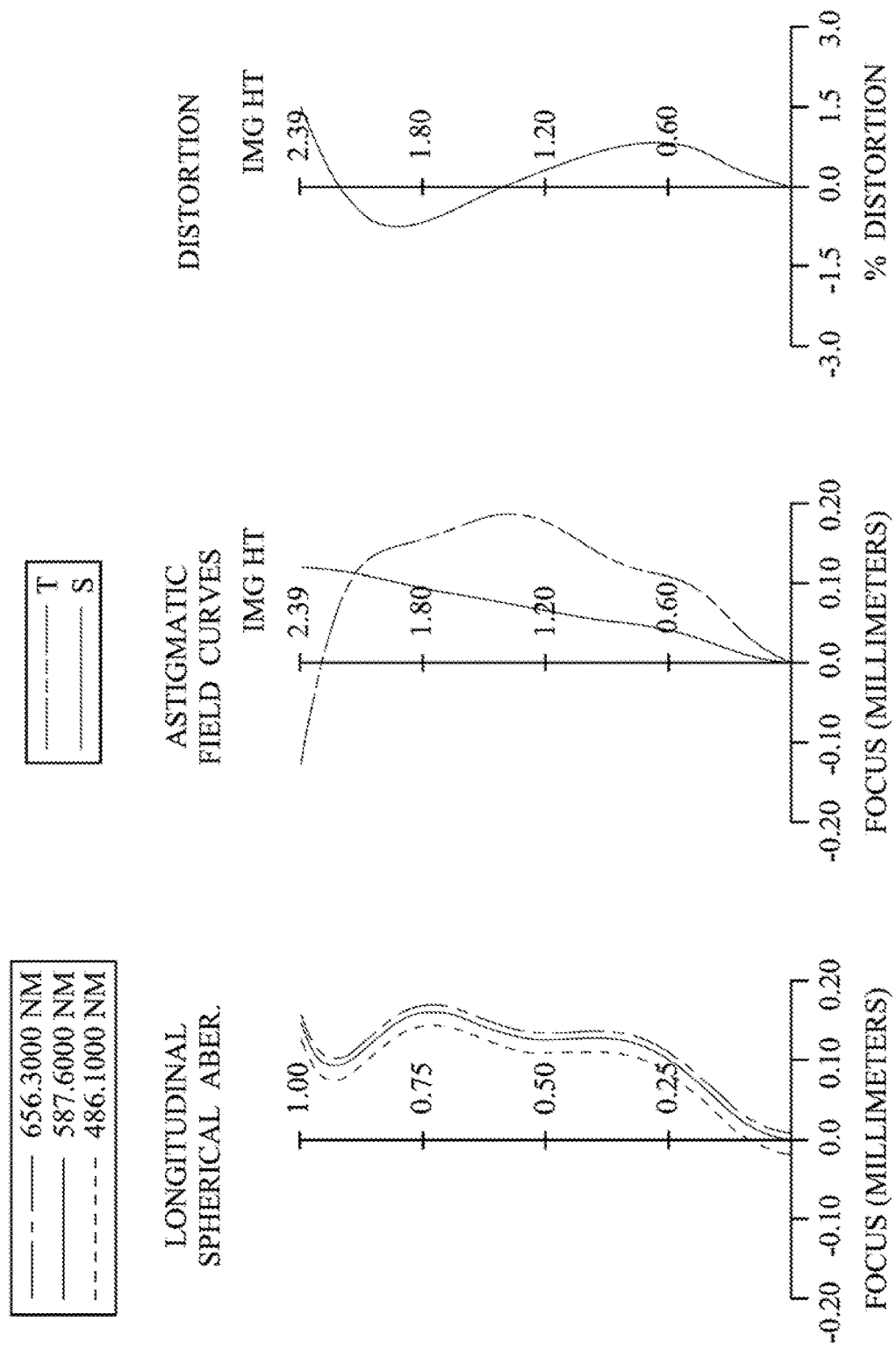
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows, in order from left to right, spherical aberration curves, astigmatic field curves and a distortion curve of the image capturing device according to the 10th embodiment.

In FIG. 19, the image capturing device includes the optical photographing lens assembly (not otherwise herein labeled) of the present disclosure and an image sensor 1080. The optical photographing lens assembly includes, in order from an object side to an image side, a first lens element 1010, an aperture stop 1000, a second lens element 1020 a third lens element 1030, a fourth lens element 1040, a fifth lens element 1050, an IR-cut filter 1060 and an image plane 1070, wherein the optical photographing lens assembly has a total of five lens elements (1010-1050) with refractive power.

The first lens element 1010 with negative refractive power has an object-side surface 1011 being convex in a paraxial region thereof and an image-side surface 1012 being concave in a paraxial region thereof, and is made of plastic material. The object-side surface 1011 and the image-side surface 1012 of the first lens element 1010 are aspheric.

The second lens element 1020 with positive refractive power has an object-side surface 1021 being convex in a paraxial region thereof and an image-side surface 1022 being concave in a paraxial region thereof, and is made of plastic material. The object-side surface 1021 and the image-side surface 1022 of the second lens element 1020 are aspheric.

The third lens element 1030 with positive refractive power has an object-side surface 1031 being convex in a paraxial region thereof and an image-side surface 1032 being concave in a paraxial region thereof, and is made of plastic material. The object-side surface 1031 and the image-side surface 1032 of the third lens element 1030 are aspheric.

The fourth lens element 1040 with positive refractive power has an object-side surface 1041 being concave in a paraxial region thereof and an image-side surface 1042 being convex in a paraxial region thereof, and is made of plastic material. The object-side surface 1041 and the image-side surface 1042 of the fourth lens element 1040 are aspheric.

The fifth lens element 1050 with negative refractive power has an object-side surface 1051 being convex in a paraxial region thereof and an image-side surface 1052 being concave in a paraxial region thereof, and is made of plastic material. The object-side surface 1051 and the image-side surface 1052 of the fifth lens element 1050 are aspheric. Furthermore, both of the object-side surface 1051 and the image-side surface 1052 of the fifth lens element 1050 have at least one inflection point.

The IR-cut filter 1060 is made of glass and located between the fifth lens element 1050 and the image plane 1070, and will not affect the focal length of the optical photographing lens assembly. The image sensor 1080 is disposed on the image plane 1070 of the optical photographing lens assembly.

The detailed optical data of the 10th embodiment are shown in. Table 19 and the aspheric surface data are shown in Table 20 below.

TABLE 19

Embodiment 10
f = 2.57 mm, Fno = 2.20, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.948 | ASP | 0.200 | Plastic | 1.565 | 56.0 | −5.99 |
| 2 | | 1.190 | ASP | 0.020 | | | | |
| 3 | Ape. Stop | Plano | | 0.030 | | | | |
| 4 | Lens 2 | 0.974 | ASP | 0.241 | Plastic | 1.565 | 56.0 | 3.09 |
| 5 | | 2.004 | ASP | 0.127 | | | | |
| 6 | Lens 3 | 1.872 | ASP | 0.338 | Plastic | 1.544 | 55.9 | 4.94 |
| 7 | | 5.769 | ASP | 0.258 | | | | |
| 8 | Lens 4 | −1.106 | ASP | 0.540 | Plastic | 1.565 | 56.0 | 2.68 |
| 9 | | −0.752 | ASP | 0.030 | | | | |
| 10 | Lens 5 | 4.654 | ASP | 0.723 | Plastic | 1.639 | 23.5 | −3.16 |
| 11 | | 1.322 | ASP | 0.500 | | | | |
| 12 | IR-cut filter | Plano | | 0.200 | Glass | 1.517 | 64.2 | — |
| 13 | | Plano | | 0.674 | | | | |
| 14 | Image | Plano | | — | | | | |

Note:
Reference wavelength is 587.6 nm (d-line).

TABLE 20

Aspheric Coefficients

| Surface # | 1 | 2 | 4 | 5 | 6 |
|---|---|---|---|---|---|
| k= | −3.0000E+01 | −2.9452E+01 | −2.0345E+01 | −7.3972E+00 | −2.4627E+01 |
| A4= | −6.8908E−02 | −8.0019E−01 | −3.3169E−01 | −9.0310E−01 | −3.3258E−01 |
| A6= | 2.2951E+00 | 2.1160E+00 | −2.4982E+00 | −1.8630E+00 | −3.9612E−02 |
| A8= | −1.8013E+01 | −8.5339E+00 | 1.0890E+01 | 2.6415E+01 | −5.3317E+00 |
| A10= | 6.4073E+01 | 2.0385E+01 | −2.6898E+01 | −1.3784E+02 | 1.8027E+01 |
| A12= | −1.1853E+02 | −3.2498E+01 | 4.8561E+01 | 3.8856E+02 | −1.5643E+01 |
| A14= | 8.5537E+01 | 2.8334E+01 | −3.4926E+01 | −5.3039E+02 | 8.3935E−01 |
| A16= | | | | 2.7821E+02 | −9.7453E−02 |

| Surface # | 7 | 8 | 9 | 10 | 11 |
|---|---|---|---|---|---|
| k= | −5.3546E+00 | −2.5614E+00 | −9.0863E−01 | −1.4117E+01 | −9.0021E+00 |
| A4= | 1.2551E−01 | 2.1897E−01 | 2.6583E−01 | −2.9038E−01 | −1.7296E−01 |
| A6= | −8.2497E−01 | −4.4884E−01 | −1.0531E+00 | −2.4548E−02 | 8.8964E−02 |
| A8= | 1.9750E+00 | 2.2060E+00 | 2.8933E+00 | 1.1113E−01 | −3.3933E−02 |
| A10= | −3.3930E+00 | −3.4254E+00 | −4.4365E+00 | 3.0307E−02 | 4.1365E−03 |
| A12= | 4.7604E+00 | 1.8060E+00 | 4.2460E+00 | −1.5714E−01 | 4.2307E−04 |
| A14= | −3.9457E+00 | 5.1913E−01 | −2.4806E+00 | −9.6619E−02 | 4.7457E−05 |
| A16= | 8.3598E−01 | −7.7177E−01 | 7.6147E−01 | 1.1132E−01 | −2.1112E−05 |

In the optical photographing lens assembly according to the 10th embodiment, the definitions of these parameters shown in the following table are the same as those stated in the 1st embodiment with corresponding values for the 10th embodiment. Moreover, these parameters can be calculated from Table 19 and Table 20 as the following values and satisfy the following conditions:

| 10th Embodiment | | | |
|---|---|---|---|
| f [mm] | 2.57 | f2/f3 | 0.63 |
| Fno | 2.20 | (|f/f1| + |f/f2| + |f/f3|)/(|f/f4| + |f/f5|) | 1.00 |
| HFOV [deg.] | 41.3 | R10/Yc52 | 1.44 |
| V5/V4 | 0.42 | SD/TD | 0.91 |
| (T23 + T45)/T34 | 0.61 | 1/tan(HFOV) | 1.14 |
| f/R6 | 0.45 | TL/ImgH | 1.62 |

11th Embodiment

Figure 22:
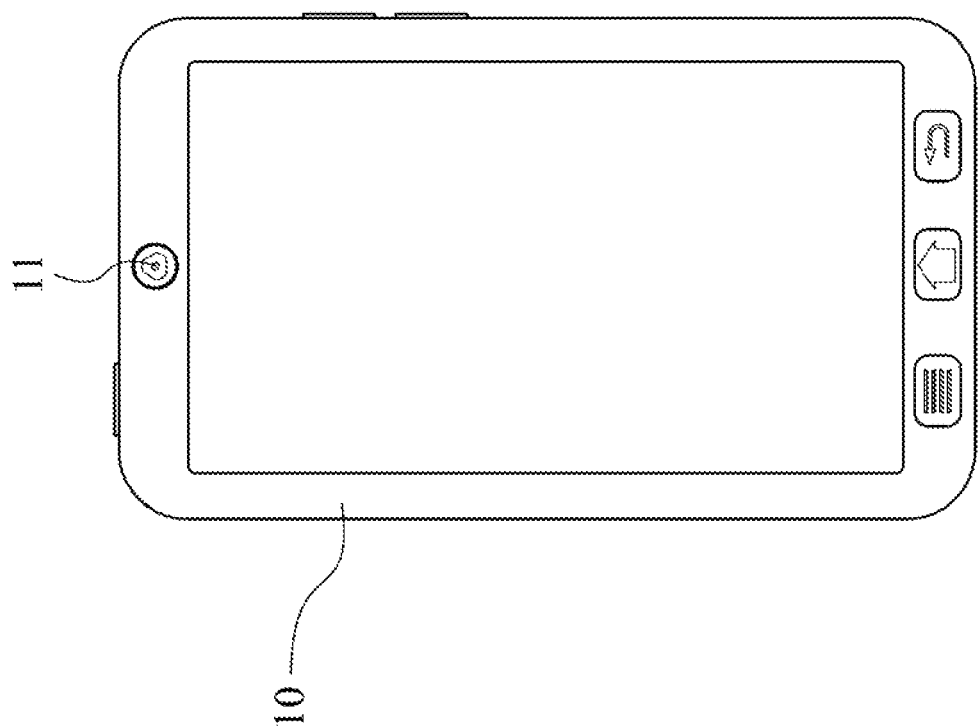
FIG. 22 shows an image capturing device according to the 11th embodiment.

FIG. 22 is a schematic view of a mobile terminal 10 according to the 11th embodiment of the present disclosure. The mobile terminal 10 of the 11th embodiment is a smart phone, wherein the mobile terminal 10 includes an image capturing device 11. The image capturing device 11 includes an optical photographing lens assembly (not otherwise herein labeled) according to the present disclosure and an image sensor (not otherwise herein labeled), wherein the image sensor is disposed on an image plane of the optical photographing lens assembly.

12th Embodiment

Figure 23:
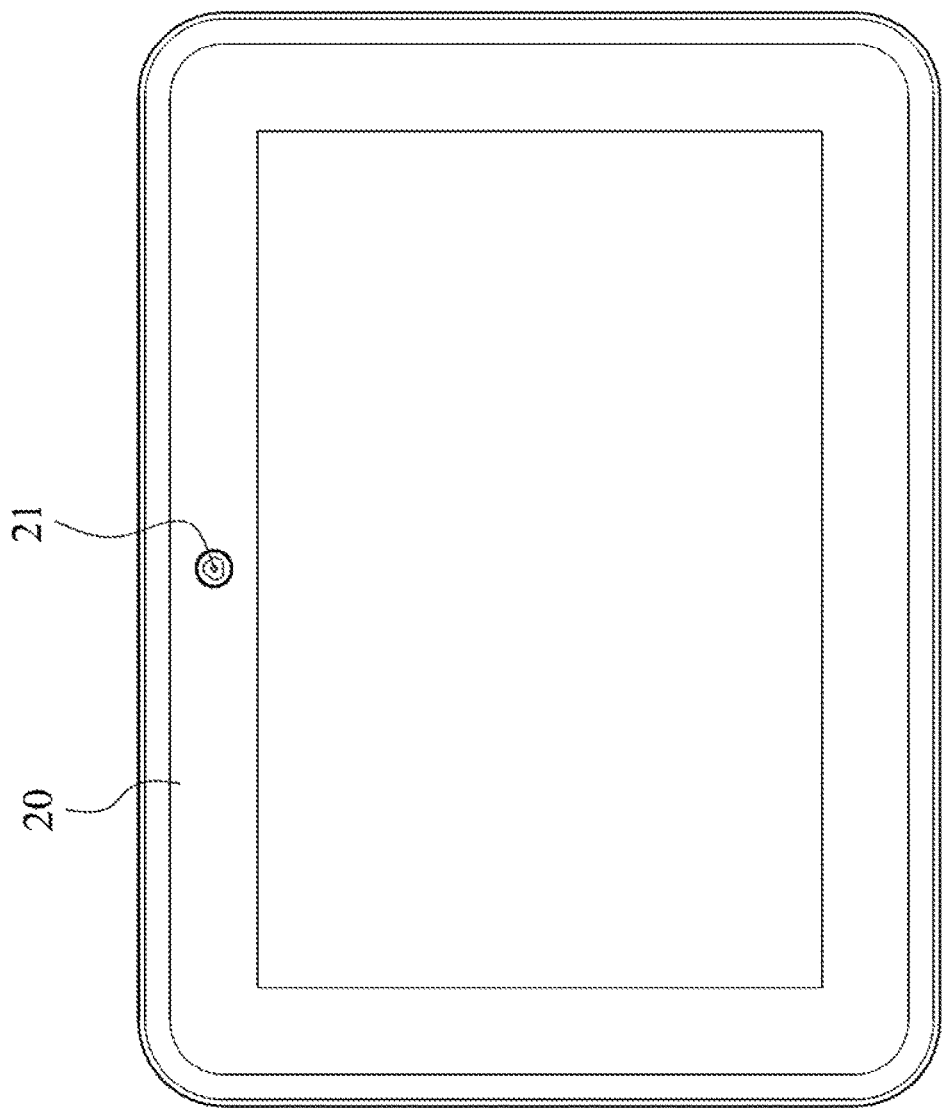
FIG. 23 shows an image capturing device according to the 12th to embodiment.

FIG. 23 is a schematic view of a mobile terminal 20 according to the 12th embodiment of the present disclosure. The mobile terminal 20 of the 12th embodiment is a tablet personal computer, wherein the mobile terminal 20 includes an image capturing device 21. The image capturing device 21 includes an optical photographing lens assembly (not otherwise herein labeled) according to the present disclosure and an image sensor (not otherwise herein labeled), wherein the image sensor is disposed on an image plane of the optical photographing lens assembly.

13th Embodiment

Figure 24:
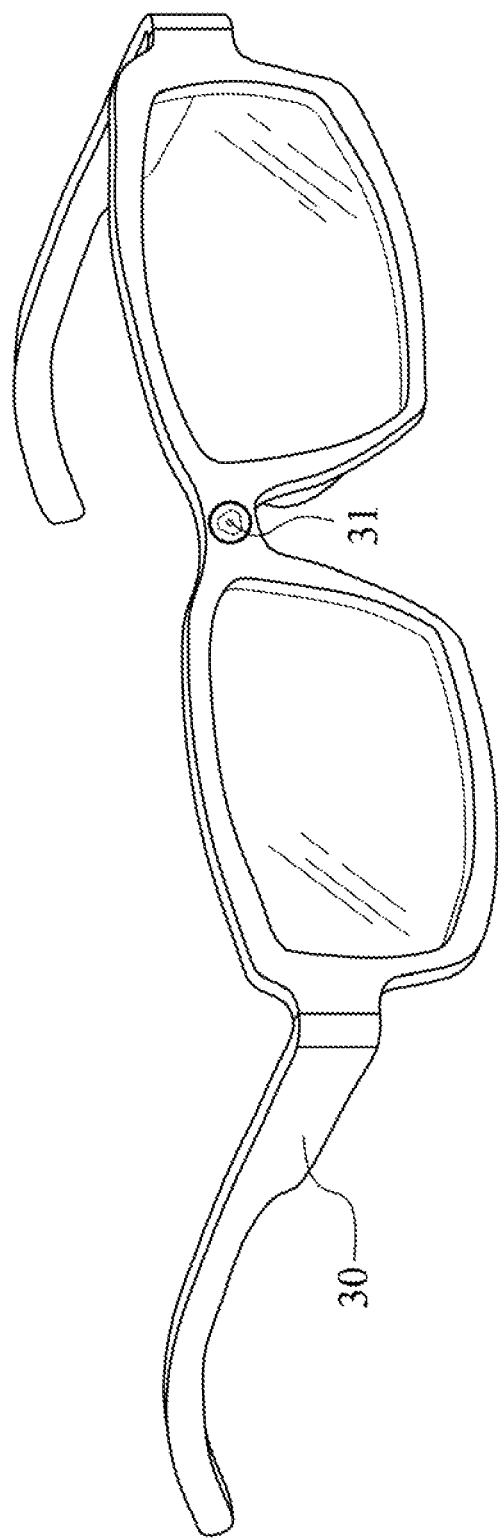
FIG. 24 shows an image capturing device according to the 13th embodiment.

FIG. 24 is a schematic view of a mobile terminal 30 according to the 13th embodiment of the present disclosure. The mobile terminal 30 of the 13th embodiment is a head-mounted display, wherein the mobile terminal 30 includes an image capturing device 31. The image capturing device 31 includes an optical photographing lens assembly (not otherwise herein labeled) according to the present disclosure and an image sensor (not otherwise herein labeled), wherein the image sensor is disposed on an image plane of the optical photographing lens assembly.

The foregoing description, for purpose of explanation, has been described with reference to specific embodiments. It is to be noted that TABLES 1-20 show different, data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising, in order from an object side to an image side:
   a first lens element;
   a second lens element having positive refractive power;
   a third lens element having an image-side surface being concave in a paraxial region thereof;
   a fourth lens element having an object-side surface being concave in a paraxial region thereof; and
   a fifth lens element with negative refractive power having an image-side surface being concave in a paraxial region thereof, wherein the image-side surface of the fifth lens element is aspheric and has at least one inflection point;
   wherein the optical photographing lens assembly has a total of five lens elements, an absolute value of a curvature radius of an object-side surface of the second lens element is larger than an absolute value of a curvature radius of the object-side surface of the fourth lens element;
   wherein an Abbe number of the fourth lens element is V4, an Abbe number of the fifth lens element is V5, a focal length of the optical photographing lens assembly is f, a curvature radius of the image-side surface of the third lens element is R6, and the following conditions are satisfied:

$0.2 < V5/V4 < 0.5$; and $0.45 \leq f/R6 < 2.0$.

2. The optical photographing lens assembly of claim 1, wherein the fifth lens element has an object-side surface being convex in a paraxial region thereof.

3. The optical photographing lens assembly of claim 1, wherein the third lens element has an object-side surface being convex in a paraxial region thereof.

4. The optical photographing lens assembly of claim 1, wherein the object-side surface of the second lens element is concave in a paraxial region thereof.

5. The optical photographing lens assembly of claim 1, wherein a half of a maximal field of view of the optical photographing lens assembly is HFOV, a curvature radius of the image-side surface of the fifth lens element is R10, a vertical distance between a non-axial critical point on the image-side surface of the fifth lens element and an optical axis is Yc52, and the following conditions are satisfied:

$0.80 < 1/\tan(HFOV) \leq 1.07$; and $0 < R10/Yc52 < 3.5$.

6. The optical photographing lens assembly of claim 1, wherein an axial distance between the second lens element and the third lens element is T23, an axial distance between the third lens element and the fourth lens element is T34, an axial distance between the fourth lens element and the fifth lens element is T45, and the following condition is satisfied:

$0 < (T23+T45)/T34 < 1.0$.

7. The optical photographing lens assembly of claim 1, wherein the absolute value of the curvature radius of the object-side surface of the second lens element is a maximum among absolute values of curvature radii of object-side surfaces and image-side surfaces of the first lens element, the second lens element, the third lens element, the fourth lens element and the fifth lens element.

8. An optical photographing lens assembly comprising, in order from an object side to an image side:
   a first lens element;
   a second lens element having positive refractive power;
   a third lens element having an image-side surface being concave in a paraxial region thereof;
   a fourth lens element; and
   a fifth lens element with negative refractive power having an image-side surface being concave in a paraxial region thereof, wherein the image-side surface of the fifth lens element is aspheric and has at least one inflection point;
   wherein the optical photographing lens assembly has a total of five lens elements, an axial distance between the second lens element and the third lens element is a minimum among axial distances between every two lens elements that are adjacent to each other;
   wherein an Abbe number of the fourth lens element is V4, an Abbe number of the fifth lens element is V5, a focal length of the optical photographing lens assembly is f, a curvature radius of the image-side surface of the third lens element is R6, and the following conditions are satisfied:

$2 < V5/V4 < 0.5$; and $0.45 \leq f/R6 < 2.0$.

9. The optical photographing lens assembly of claim 8, wherein the third lens element has an object-side surface being convex in a paraxial region thereof.

10. The optical photographing lens assembly of claim 8, wherein the second lens element has an image-side surface being convex in a paraxial region thereof, the fourth lens element with positive refractive power has an image-side surface being convex in a paraxial region thereof, a half of a maximal field of view of the optical photographing lens assembly is HFOV, and the following condition is satisfied:

$$0.80 < 1/\tan(HFOV) < 1.40.$$

11. The optical photographing lens assembly of claim 8, wherein the second lens element has an object-side surface being concave in a paraxial region thereof.

12. The optical photographing lens assembly of claim 8, wherein the axial distance between the second lens element and the third lens element is T23, an axial distance between the third lens element and the fourth lens element is T34, an axial distance between the fourth lens element and the fifth lens element is T45, and the following condition is satisfied:

$$0 < (T23+T45)/T34 < 1.0.$$

13. The optical photographing lens assembly of claim 8, wherein a central thickness of the fifth lens element is larger than a central thickness of the second lens element.

14. An optical photographing lens assembly comprising, in order from an object side to an image side:
   a first lens element;
   a second lens element having positive refractive power;
   a third lens element having an image-side surface being concave in a paraxial region thereof;
   a fourth lens element; and
   a fifth lens element with negative refractive power having an image-side surface being concave in a paraxial region thereof, wherein the image-side surface of the fifth lens element is aspheric and has at least one inflection point;
   wherein the optical photographing lens assembly has a total of five lens elements, an axial distance between the first lens element and the second lens element is larger than a central thickness of the second lens element;
   wherein an Abbe number of the fourth lens element is V4, an Abbe number of the fifth lens element is V5, an axial distance between an object-side surface of the first lens element and an image plane is TL, a maximum image height of the optical photographing lens assembly is ImgH, and the following conditions are satisfied:

$$0.2 < V5/V4 < 0.5; \text{ and}$$

$$0.8 < TL/ImgH < 2.5.$$

15. The optical photographing lens assembly of claim 14, wherein the first lens element has the object-side surface being convex in a paraxial region thereof and an image-side surface being concave in a paraxial region thereof.

16. The optical photographing lens assembly of claim 14, wherein the second lens element has an image-side surface being convex in a paraxial region thereof, a half of a maximal field of view of the optical photographing lens assembly is HFOV, and the following condition is satisfied:

$$0.80 < 1/\tan(HFOV) \leq 1.07.$$

17. The optical photographing lens assembly of claim 14, wherein the third lens element has an object-side surface being convex in a paraxial region thereof.

18. The optical photographing lens assembly of claim 14, wherein the fourth lens element has an object-side surface being concave in a paraxial region thereof.

19. The optical photographing lens assembly of claim 14, wherein a focal length of the optical photographing lens assembly is f, a curvature radius of the image-side surface of the third lens element is R6, and the following condition is satisfied:

$$0.45 \leq f/R6 < 2.0.$$

20. The optical photographing lens assembly of claim 14, wherein a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, and the following condition is satisfied:

$$0 < (|f/f1|+|f/f2|+|f/f3|)/(|f/f4|+|f/f5|) < 0.6.$$

21. The optical photographing lens assembly of claim 14, wherein a central thickness of the fifth lens element is larger than the central thickness of the second lens element.

22. An image capturing device, comprising:
   the optical photographing lens assembly of claim 14; and
   an image sensor, wherein the image sensor is disposed on the image plane of the optical photographing lens assembly.

23. A mobile terminal, comprising:
   the image capturing device of claim 22.

24. An optical photographing lens assembly comprising, in order from an object side to an image side:
   a first lens element;
   a second lens element having positive refractive power;
   a third lens element having an image-side surface being concave in a paraxial region thereof;
   a fourth lens element; and
   a fifth lens element with negative refractive power having an image-side surface being concave in a paraxial region thereof, wherein the image-side surface of the fifth lens element is aspheric and has at least one inflection point;
   wherein the optical photographing lens assembly has a total of five lens elements, an Abbe number of the first lens element is equal to an Abbe number of the fifth lens element;
   wherein an Abbe number of the fourth lens element is V4, the Abbe number of the fifth lens element is V5, and the following condition is satisfied:

$$0.2 < V5/V4 < 0.5.$$

25. The optical photographing lens assembly of claim 24, wherein the fifth lens element has an object-side surface being convex in a paraxial region thereof.

26. The optical photographing lens assembly of claim 24, wherein the fourth lens element has an object-side surface being concave in a paraxial region thereof.

27. The optical photographing lens assembly of claim 24, wherein the third lens element has an object-side surface being convex in a paraxial region thereof.

28. The optical photographing lens assembly of claim 24, wherein an axial distance between the second lens element and the third lens element is T23, an axial distance between the third lens element and the fourth lens element is T34, an axial distance between the fourth lens element and the fifth lens element is T45, and the following condition is satisfied:

$$0 < (T23+T45)/T34 < 1.0.$$

29. The optical photographing lens assembly of claim 24, wherein a focal length of the optical photographing lens assembly is f, a curvature radius of the image-side surface of the third lens element is R6, and the following condition is satisfied:

$$0.45 \leq f/R6 < 2.0.$$

30. The optical photographing lens assembly of claim 24, wherein a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, and the following condition is satisfied:

$0<(|f/f1|+|f/f2|+|f/f3|)/(|f/f4|+|f/f5|)<0.6$.

31. The optical photographing lens assembly of claim 24, wherein a curvature radius of the image-side surface of the fifth lens element is R10, a vertical distance between a non-axial critical point on the image-side surface of the fifth lens element and an optical axis is Yc52, an axial distance between an object-side surface of the first lens element and an image plane is TL, a maximum image height of the optical photographing lens assembly is ImgH, and the following conditions are satisfied:

$0<R10/Yc52<3.5$; and $0.8<TL/ImgH<2.5$.

32. An optical photographing lens assembly comprising, in order from an object side to an image side:
    a first lens element;
    a second lens element having positive refractive power;
    a third lens element having an image-side surface being concave in a paraxial region thereof;
    a fourth lens element; and
    a fifth lens element with negative refractive power having an image-side surface being concave in a paraxial region thereof, wherein the image-side surface of the fifth lens element is aspheric and has at least one inflection point;
    wherein the optical photographing lens assembly has a total of five lens elements, the first lens element and the third lens element are made of a same material;
    wherein an Abbe number of the fourth lens element is V4, an Abbe number of the fifth lens element is V5, and the following condition is satisfied:

$0.2<V5/V4<0.5$.

33. The optical photographing lens assembly of claim 32, wherein the fifth lens element has an object-side surface being convex in a paraxial region thereof.

34. The optical photographing lens assembly of claim 32, wherein the second lens element has an object-side surface being concave in a paraxial region thereof.

35. The optical photographing lens assembly of claim 32, wherein the fourth lens element has an object-side surface being concave in a paraxial region thereof.

36. The optical photographing lens assembly of claim 32, wherein a focal length of the optical photographing lens assembly is f, a curvature radius of the image-side surface of the third lens element is R6, and the following condition is satisfied:

$0.45 \leq f/R6 < 2.0$.

37. The optical photographing lens assembly of claim 32, wherein a central thickness of the fifth lens element is larger than a central thickness of the second lens element.

38. The optical photographing lens assembly of claim 32, wherein an absolute value of a curvature radius of an object-side surface of the second lens element is a maximum among absolute values of curvature radii of object-side surfaces and image-side surfaces of the first lens element, the second lens element, the third lens element, the fourth lens element and the fifth lens element.

39. An optical photographing lens assembly comprising, in order from an object side to an image side:
    a first lens element;
    a second lens element having positive refractive power;
    a third lens element having an image-side surface being concave in a paraxial region thereof;
    a fourth lens element having an object-side surface being concave in a paraxial region thereof; and
    a fifth lens element with negative refractive power having an image-side surface being concave in a paraxial region thereof, wherein the image-side surface of the fifth lens element is aspheric and has at least one inflection point;
    wherein the optical photographing lens assembly has a total of five lens elements, a central thickness of the fourth lens element is larger than a central thickness of the fifth lens element, an absolute value of a curvature radius of an object-side surface of the second lens element is larger than an absolute value of a curvature radius of an object-side surface of the first lens element, the absolute value of the curvature radius of the object-side surface of the second lens element is larger than an absolute value of a curvature radius of the object-side surface of the fourth lens element;
    wherein an Abbe number of the fourth lens element is V4, an Abbe number of the fifth lens element is V5, and the following condition is satisfied:

$0.2<V5/V4<0.5$.

40. The optical photographing lens assembly of claim 39, wherein the first lens element has the object-side surface being convex in a paraxial region thereof and an image-side surface being concave in a paraxial region thereof.

41. The optical photographing lens assembly of claim 39, wherein the fifth lens element has an object-side surface being convex in a paraxial region thereof.

42. The optical photographing lens assembly of claim 39, wherein the fourth lens element with positive refractive power has an image-side surface being convex in a paraxial region thereof, a curvature radius of the image-side surface of the fifth lens element is R10, a vertical distance between a non-axial critical point on the image-side surface of the fifth lens element and an optical axis is Yc52, and the following condition is satisfied:

$0<R10/Yc52<3.5$.

43. The optical photographing lens assembly of claim 39, wherein the central thickness of the fifth lens element is larger than a central thickness of the second lens element.

44. The optical photographing lens assembly of claim 39, further comprising:
    an aperture stop, wherein an axial distance between the aperture stop and the image-side surface of the fifth lens element is SD, an axial distance between the object-side surface of the first lens element and the image-side surface of the fifth lens element is TD, and the following condition is satisfied:

$0.8<SD/TD<1.1$.

* * * * *

UNITED STATES PATENT AND TRADEMARK OFFICE
CERTIFICATE OF CORRECTION

PATENT NO. : 10,345,554 B2
APPLICATION NO. : 15/273681
DATED : July 9, 2019
INVENTOR(S) : Tsung-Han Tsai and Hsin-Hsuan Huang It is certified that error appears in the above-identified patent and that said Letters Patent is hereby corrected as shown below:

In the Claims (1) In Column 36, Line 57, Claim 8 reads as "$2 < V5/V4 < 0.5$", but it should read as "$0.2 < V5/V4 < 0.5$".

Signed and Sealed this
Twenty-second Day of October, 2019

Andrei Iancu
*Director of the United States Patent and Trademark Office*